(12) United States Patent
Livingston, Jr.

(10) Patent No.: US 11,912,324 B1
(45) Date of Patent: Feb. 27, 2024

(54) DOLLY AND CART SYSTEM WITH INDEPENDENTLY SLIDABLE JAWS

(71) Applicant: Omni Cubed, Inc., Shingle Springs, CA (US)

(72) Inventor: Larry Leigh Livingston, Jr., Cameron Park, CA (US)

(73) Assignee: OMNI CUBED, INC., Shingle Springs, CA (US)

( * ) Notice: Subject to any disclaimer, the term of this patent is extended or adjusted under 35 U.S.C. 154(b) by 0 days.

(21) Appl. No.: 18/381,928

(22) Filed: Oct. 19, 2023

(51) Int. Cl.
*B62B 5/00* (2006.01)
*B62B 1/14* (2006.01)
*F16H 25/20* (2006.01)
*B60B 33/00* (2006.01)

(52) U.S. Cl.
CPC ........ *B62B 5/0093* (2013.01); *B60B 33/0002* (2013.01); *B62B 1/142* (2013.01); *F16H 25/2025* (2013.01); *B62B 2203/44* (2013.01)

(58) Field of Classification Search
CPC ... B62B 5/0093; B62B 5/0083; B62B 5/0086; B62B 1/06; B62B 1/14; B62B 1/142; B62B 2203/44; B62B 2203/60; B62B 2207/00; B62B 2207/02; B60B 33/0002; F16H 25/2025; F16H 25/204; Y10T 74/19735
See application file for complete search history.

(56) References Cited

U.S. PATENT DOCUMENTS

| | | | | | |
|---|---|---|---|---|---|
| 2,138,245 | A | * | 11/1938 | Smith | B25B 5/101 81/162 |
| 2,463,263 | A | * | 3/1949 | Gordon | B25B 5/101 74/424.78 |
| 3,757,591 | A | * | 9/1973 | Taylor | F16H 25/20 74/424.78 |
| 3,861,662 | A | * | 1/1975 | Morse | B62B 1/268 269/904 |
| 4,098,518 | A | * | 7/1978 | Minkoff | B62B 5/0083 280/47.131 |

(Continued)

FOREIGN PATENT DOCUMENTS

DE 102014018329 A1 * 6/2016
EP 0445499 A1 * 9/1991
(Continued)

*Primary Examiner* — Steve Clemmons
(74) *Attorney, Agent, or Firm* — Manuel F. de la Cerra

(57) ABSTRACT

A dolly is disclosed that includes a caster/jaw support member, an upper jaw assembly, a lower jaw assembly, and casters. The upper jaw assembly includes a jaw slidably mounted to the caster/jaw support member and a selectively engageable threading structure with a partially-threaded hole, wherein the threading structure extends from the upper jaw assembly to the lower jaw assembly. The lower jaw assembly includes a lower jaw carriage slidably mounted to the caster/jaw support member, and the selectively engageable threading structure is disposed in the lower jaw carriage. A threaded shaft connected to an adjustment knob can be engaged and disengaged by the selectively engageable threading structure. A set of casters is connected to and extends away from the caster/jaw support member. Multiple dollies can be connected together by a crossmember to form a larger cart.

28 Claims, 27 Drawing Sheets

(56) References Cited

U.S. PATENT DOCUMENTS

| | | | | |
|---|---|---|---|---|
| 4,270,741 A * | 6/1981 | Hurst | ................ | B25B 5/04 269/33 |
| 4,582,307 A * | 4/1986 | Wang | ................ | B25B 1/125 269/182 |
| 5,970,812 A * | 10/1999 | Fan | ................ | B25B 1/125 74/424.78 |
| 6,443,441 B1 * | 9/2002 | Buitenhuis | ........ | B25B 5/067 269/905 |
| 6,935,656 B2 * | 8/2005 | Stout | ................ | B60B 25/20 280/43.1 |
| 8,002,510 B2 * | 8/2011 | Williams | ........ | B62B 1/268 414/490 |
| 8,100,419 B2 * | 1/2012 | Morisset | ........ | B62B 5/0083 280/79.7 |
| 8,312,598 B2 * | 11/2012 | Palmer | ............ | B62B 1/202 16/422 |
| 8,899,599 B2 * | 12/2014 | Whitefield | ........ | B62B 5/0083 280/35 |
| 8,960,693 B1 * | 2/2015 | Cotner | ............ | B62B 5/0083 280/47.131 |
| 10,189,147 B2 * | 1/2019 | Livingston, Jr. | ........ | B25B 5/003 |
| 10,569,903 B2 * | 2/2020 | Coccaro | ............ | B60P 3/11 |
| 10,591,032 B2 * | 3/2020 | Wixey | ........ | A61B 17/07207 |
| 2006/0231674 A1 * | 10/2006 | Lin | ............ | B66F 5/02 242/615.2 |
| 2009/0101437 A1 * | 4/2009 | Abraham | ........ | E06C 7/08 16/29 |
| 2012/0112426 A1 * | 5/2012 | Volkmann | ........ | B62B 7/04 280/107 |

FOREIGN PATENT DOCUMENTS

| | | | | |
|---|---|---|---|---|
| ES | 2330423 T3 * | 12/2009 | ........ | F16H 25/2025 |
| FR | 2704292 A1 * | 10/1994 | ........ | B25B 1/125 |

\* cited by examiner (Section A-A from FIG. 1E)

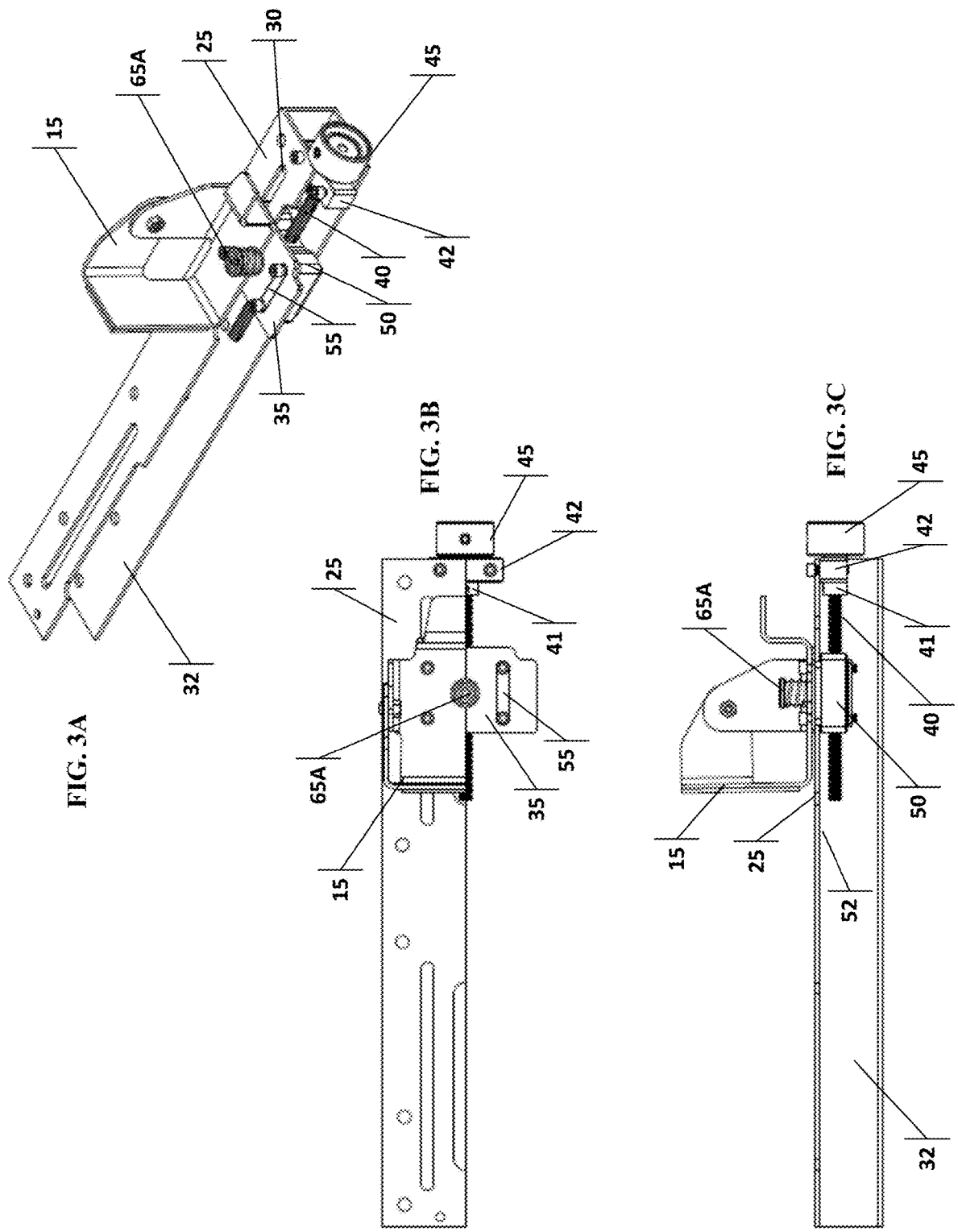

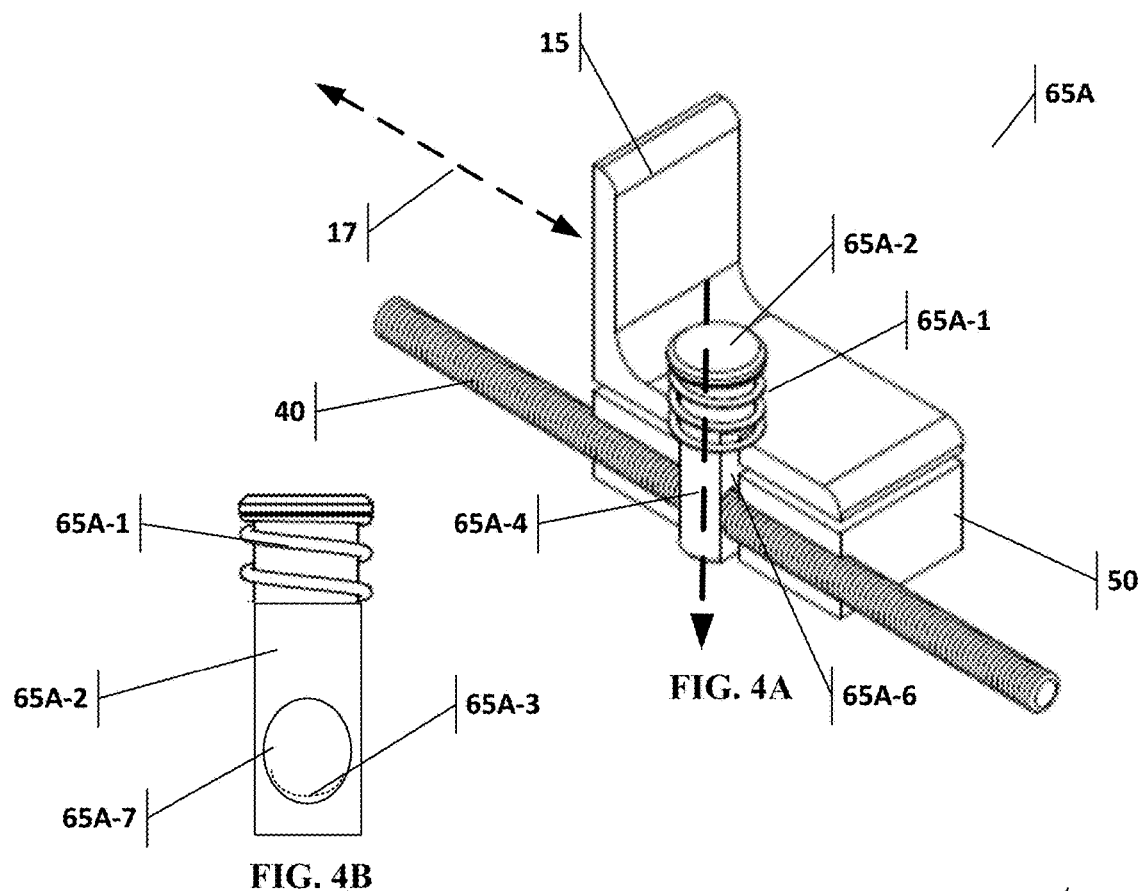
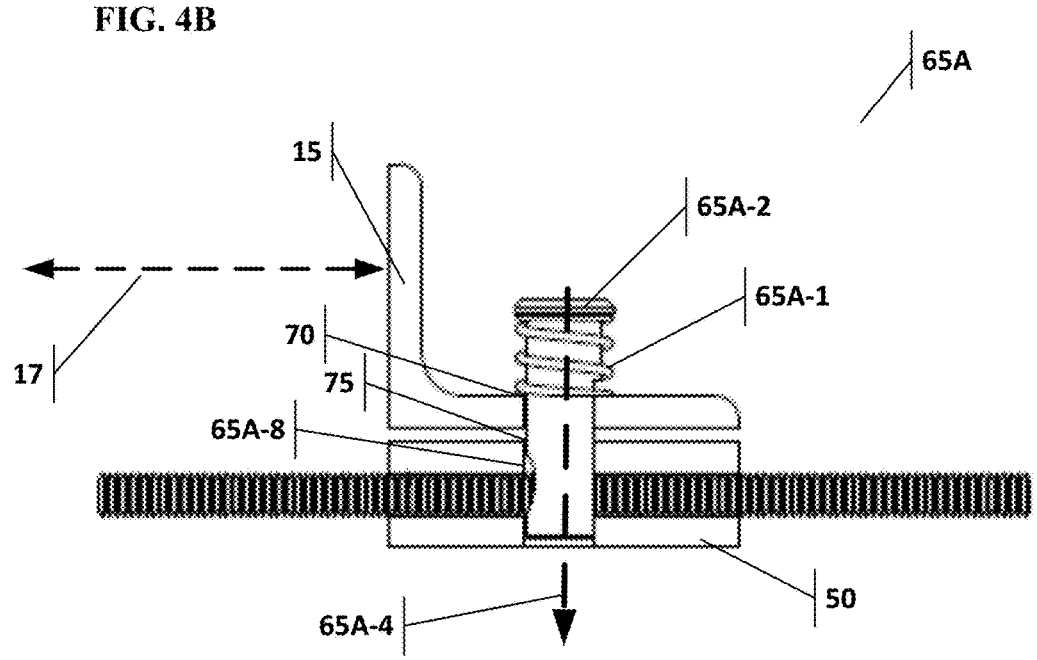

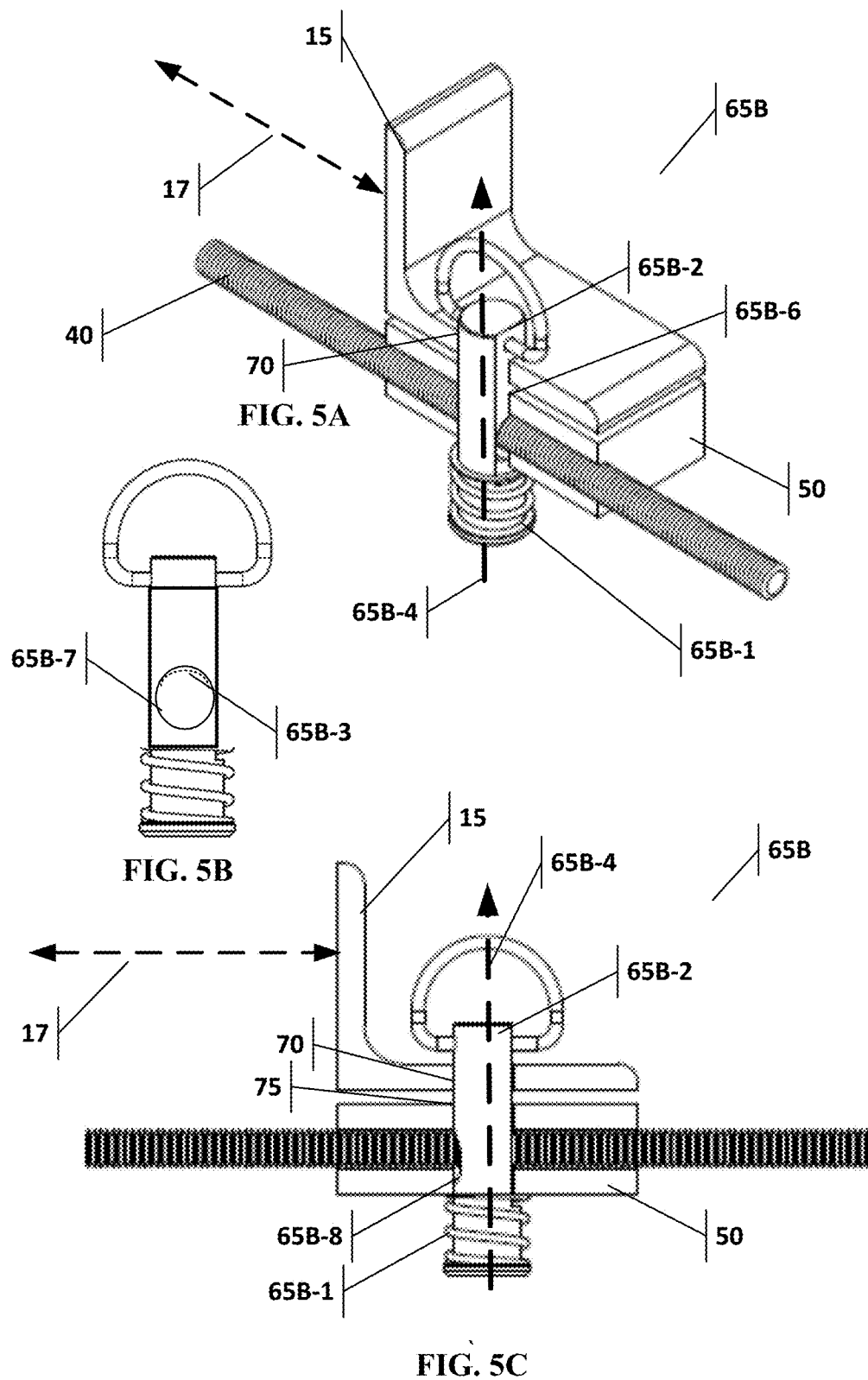

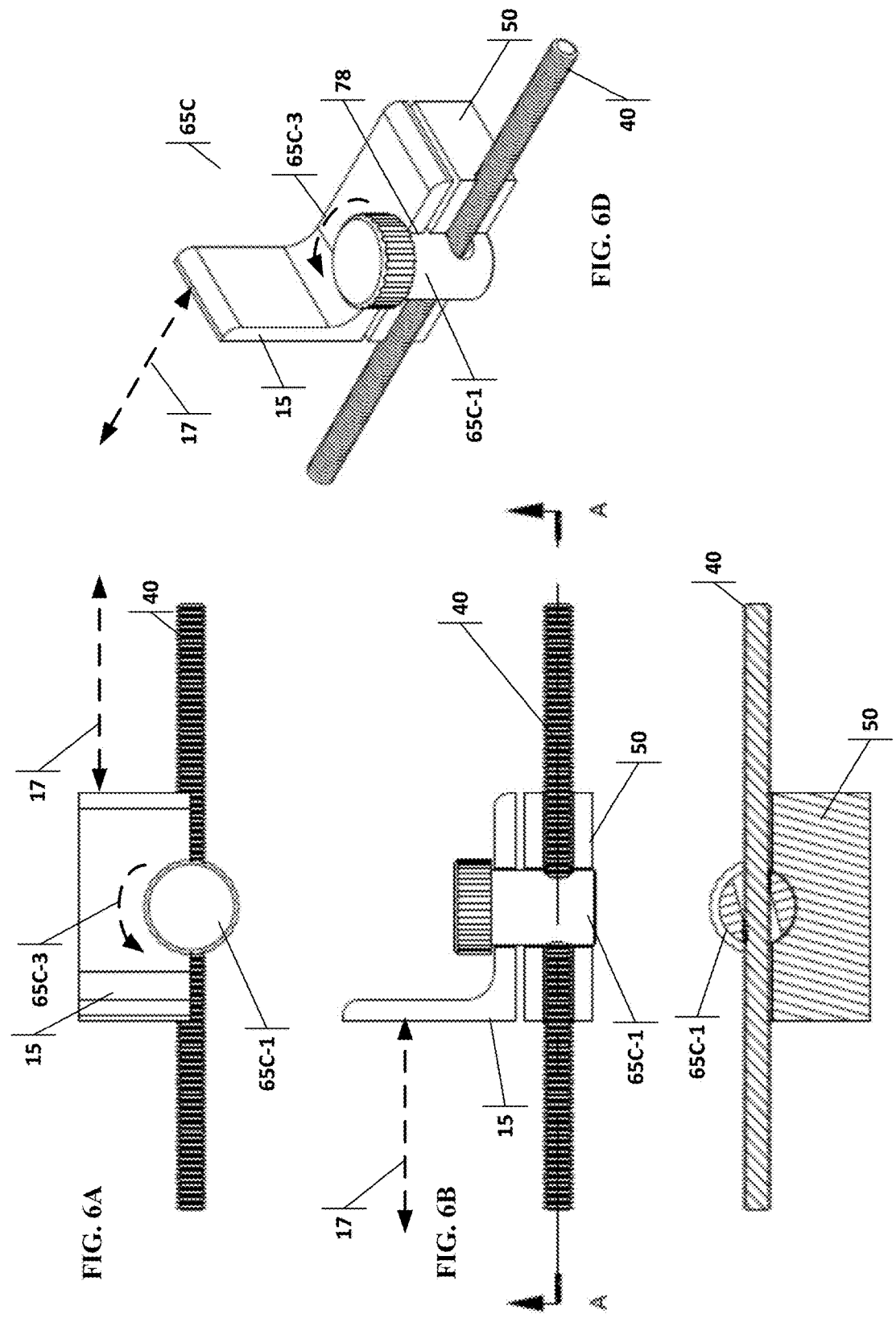

(Section A-A from FIG. 6E)

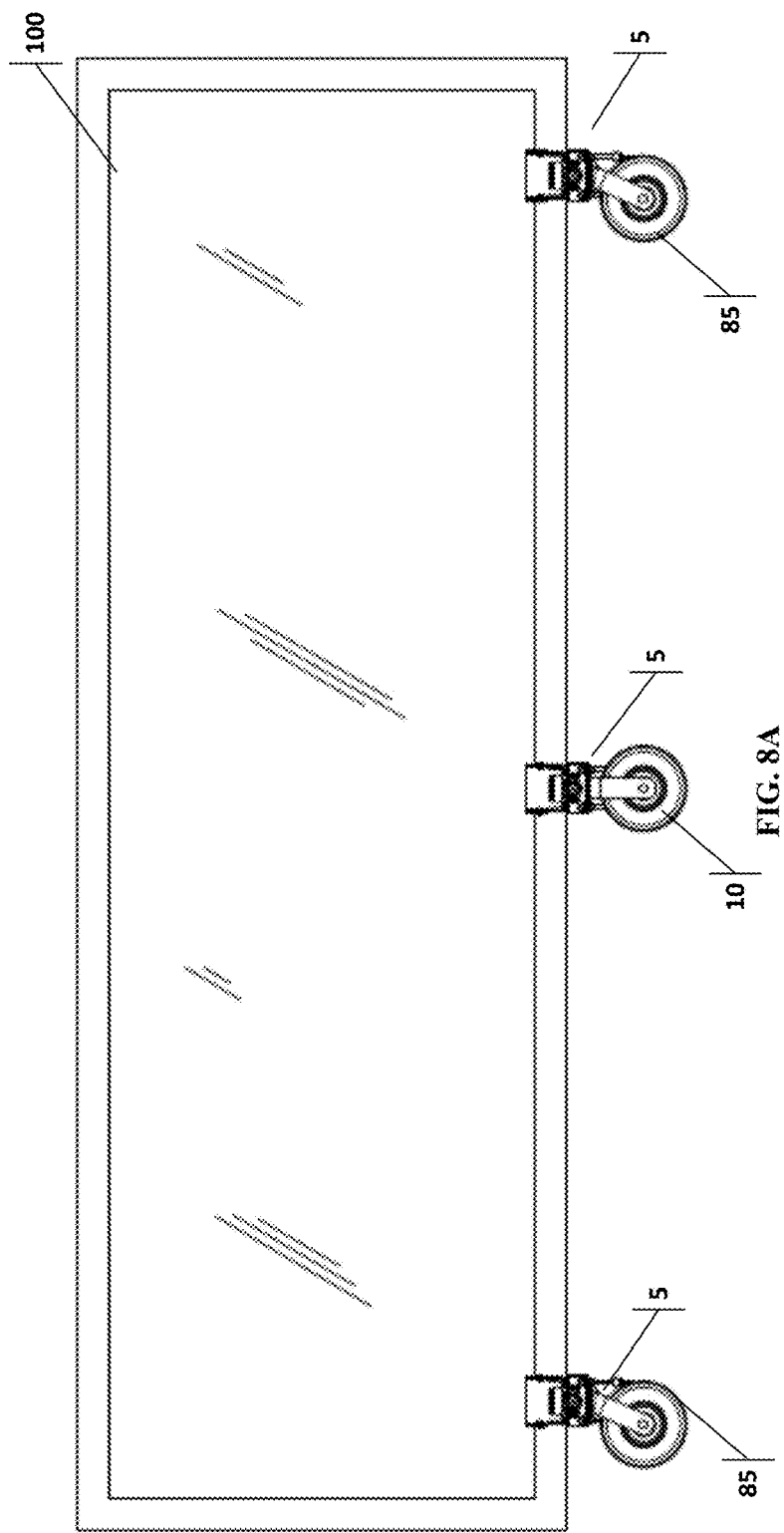

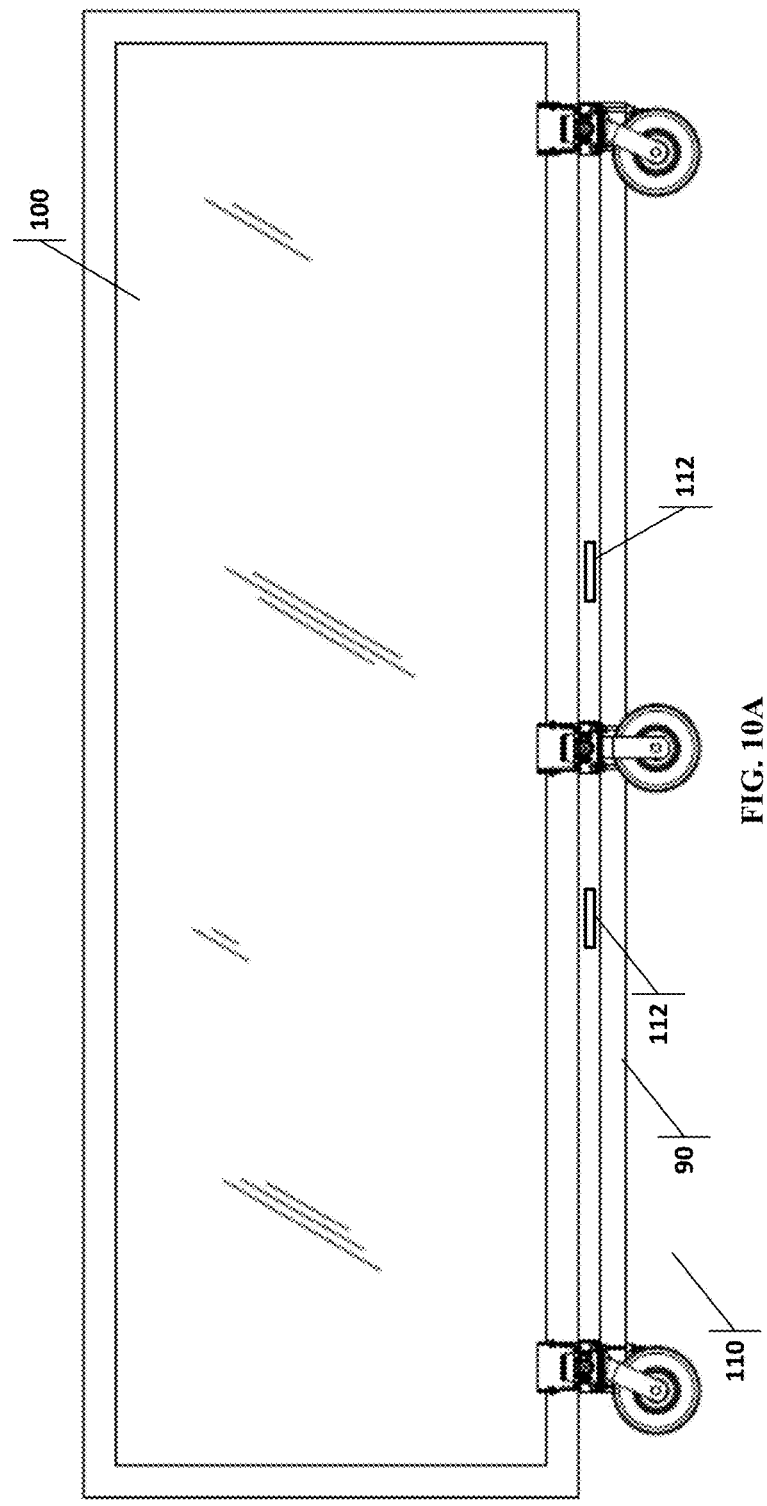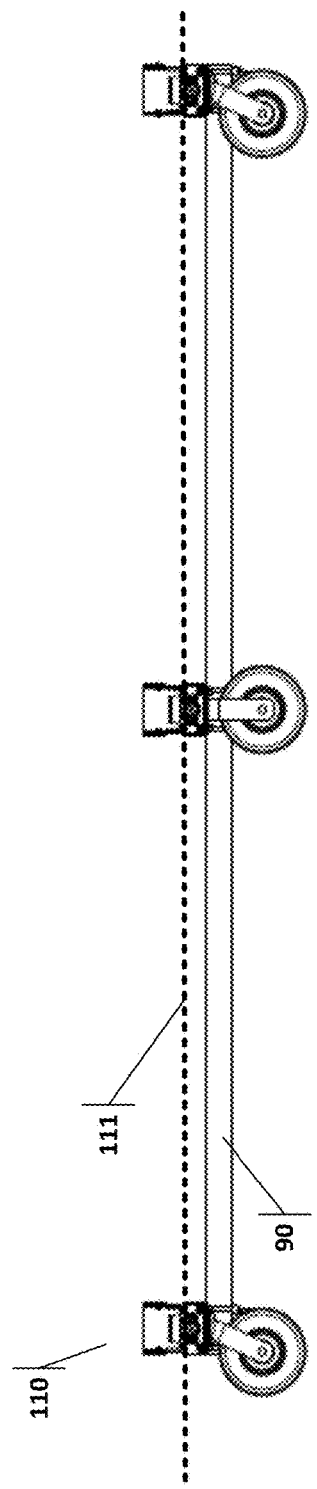

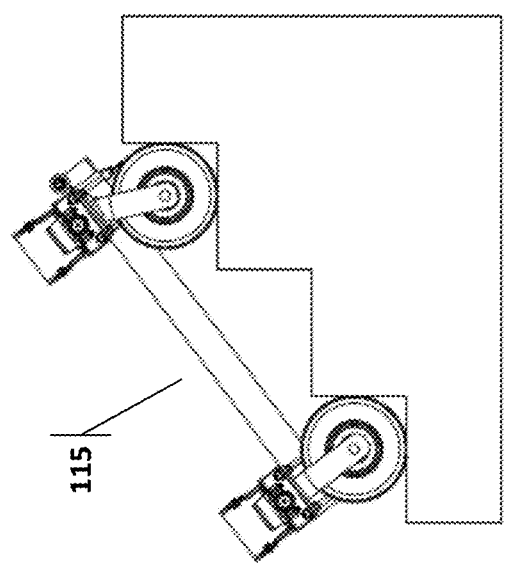
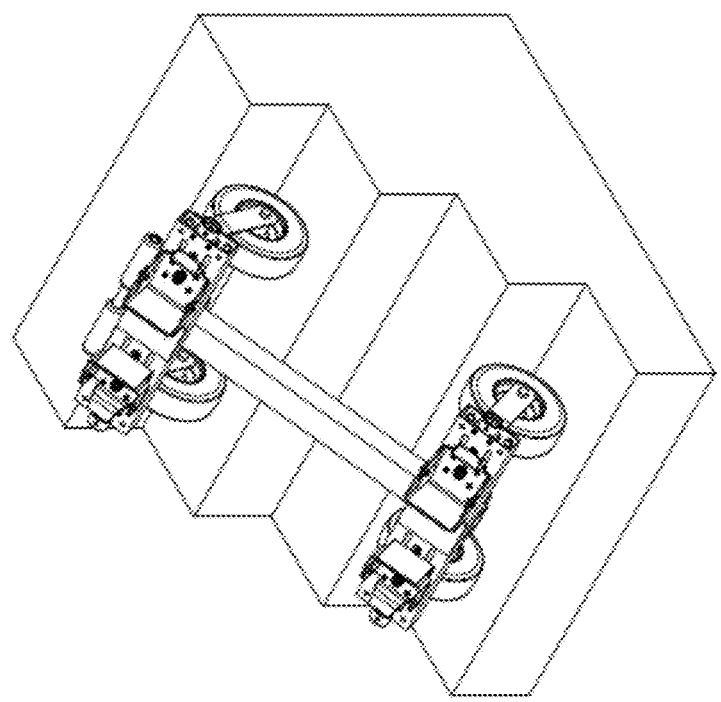
FIG. 16A
FIG. 16B

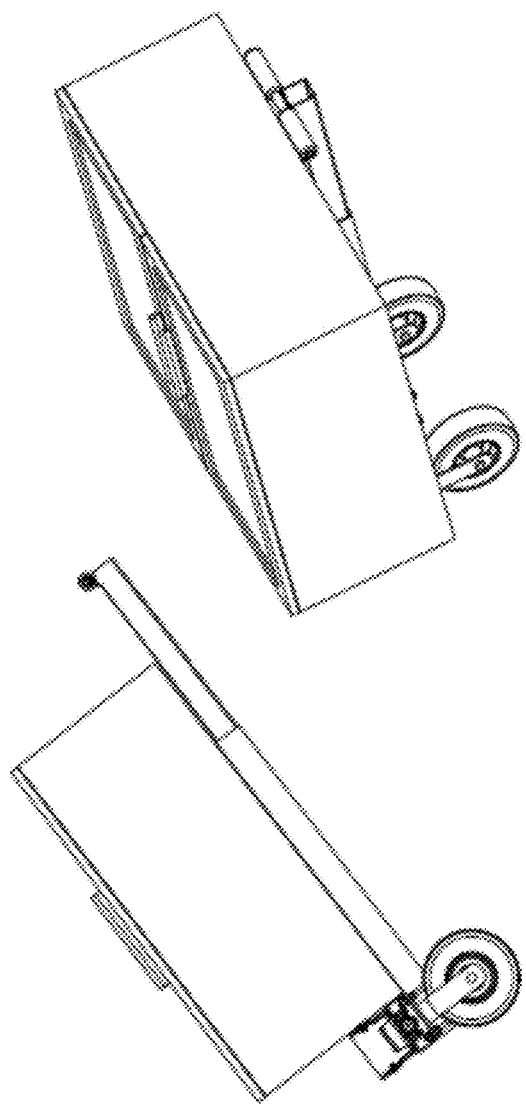
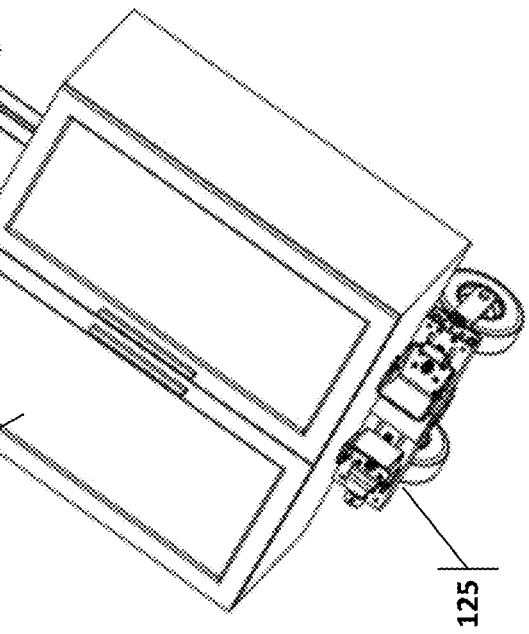
FIG. 17C
FIG. 17B
FIG. 17A

DOLLY AND CART SYSTEM WITH INDEPENDENTLY SLIDABLE JAWS

1.0 CROSS-REFERENCE TO RELATED APPLICATIONS

None

2.0 FIELD OF THE INVENTION

This invention relates to dollies and carts.

3.0 BACKGROUND

Material handling at construction jobsites will always have its challenges. The weight and/or shape of the material, the jobsite terrain, the lack of available workers, and the cost of specialized equipment or rental equipment, are just some aspects that contribute to material handling difficulties and safety concerns.

Large timber and steel header beams are examples that present particular challenges at a construction jobsite due to weight and length. Delivery trucks often cannot maneuver to a residential backyard where a header beam might need to be installed. In these instances, the contractor may need to rent a crane or an all-terrain forklift, or may need to hire more workers to carry the beam to the back of the house. A cart of the present invention is shown in FIG. 11 transporting a glulam wood beam.

Structural Insulated Panels (SIPs) that are used to construct some buildings are mostly used in new construction. New construction jobsites (at the time of framing) do not have driveways, patios, or sidewalks yet. The terrain is mostly dirt, gravel, and very uneven. Moving these panels from the truck to the portion of the wall where they are to be installed is extremely difficult without a crane. A cart of the present invention is shown in FIG. 12 transporting a SIP.

Framed glass windows are often large, heavy, and awkward to move around a jobsite. Pre-framed hurricane glass is particularly heavy due to it being much thicker, and the center of mass of the glass is not in the center of the frame. It is not uncommon for these windows to weigh 600 to 1,000 pounds or more. Carrying these windows long distances is not practical due to the weight and odd shape. Vacuum cups with handles are often attached to the glass to help workers grab it and carry it, but easily slide on the material when lifting something beyond their weight capacity. A cart of the present invention is shown in FIG. 10A transporting a pre-framed glass window.

These and many other examples of material handling challenges on construction jobsites could be overcome with a cart or dolly of the present invention.

4.0 SUMMARY

The present invention provides an elegant solution to the needs described above and offers numerous additional benefits and advantages, as will be apparent to persons of skill in the art. A dolly is disclosed that includes a caster/jaw support member, an upper jaw assembly, a lower jaw assembly and casters. The caster/jaw support member includes a first surface opposite to a second surface, a sliding guide channel within the first and second surfaces, and a slot within the first and second surfaces. The upper jaw assembly includes a jaw slidably mounted to the first surface and a selectively engageable threading structure with a partially-threaded hole, wherein the threading structure extends from the upper jaw assembly to the lower jaw assembly. The lower jaw assembly includes a lower jaw carriage slidably mounted to the caster/jaw support member, and the selectively engageable threading structure is disposed in the lower jaw carriage. A threaded shaft connected to an adjustment knob can be engaged and disengaged by the selectively engageable threading structure. A set of casters is connected to and extends away from the caster/jaw support member. A fastener may connect the lower jaw carriage to the first jaw through the sliding guide channel.

The dolly may have a disengaged configuration, where the selectively engageable threading structure is moved so as to disengage the threads of the partially-threaded hole from the threaded shaft, thereby allowing the first jaw to slide along the first surface without restriction from the threaded shaft. The dolly may also have an engaged configuration, where the selectively engageable threading structure is moved so as to engage the threads of the partially-threaded hole with the threaded shaft, such that rotating the adjustment knob causes the first jaw to slide along the first surface. The movement for engagement and disengagement of the selectively engageable threading structure may be translational or rotational.

The selectively engageable threading structure may include a spring and a partially-threaded slide block, wherein threads of the partially-threaded hole are limited to positions in the range of 3:00 to 9:00.

The selectively engageable threading structure may include a spring and a partially-threaded slide block, wherein threads of the partially-threaded hole are limited to positions in the range of 9:00 to 3:00.

The selectively engageable threading structure may include a partially-threaded rotating block, wherein threads of the partially-threaded hole are limited to positions in the range of 12:00 to 6:00 in a first region of the partially-threaded hole and limited to positions in the range of 6:00 to 12:00 in a second region of the partially-threaded hole.

The dolly may include a second upper jaw assembly with a second jaw connected to a second lower jaw assembly. A low-friction slide member may be sandwiched in between the first surface and the first jaw. The lower jaw carriage may include carriage guide structures disposed in the sliding guide channel. A crossmember support may be connected to the caster/jaw support member, and a crossmember may be connected to the crossmember support. The crossmember may have a bend and/or a handle. The crossmember may be used to connect multiple dollies, forming a cart.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 3A is a top perspective view of a portion of the dolly of FIG. 1A.

FIG. 3B is a top view of a portion of the dolly of FIG. 1A.

FIG. 3C is a front view of a portion of the dolly of FIG. 1A.

FIG. 4A is a cut-away top perspective view of a selectively engageable threading structure installed on the dolly that may be disengaged by pushing in the direction of arrow 65A-4.

FIG. 4B is the partially-threaded slide block of the selectively engageable threading structure of FIG. 4A.

FIG. 4C is a cut-away side view of a selectively engageable threading structure installed on the dolly that may be disengaged by pushing in the direction of arrow 65A-4.

FIG. 5A is a cut-away top perspective view of a selectively engageable threading structure installed on the dolly, and that may be disengaged by pulling in the direction of arrow 65B-4.

FIG. 5B is the partially-threaded slide block of the selectively engageable threading structure of FIG. 5A.

FIG. 5C is a cut-away side view of a selectively engageable threading structure installed on the dolly, and that may be disengaged by pulling in the direction of arrow 65B-4.

FIG. 6A is a cut-away top view of a selectively engageable threading structure installed on the dolly, and that may be disengaged by rotating in the direction of arrow 65C-3.

FIG. 6B is a cut-away side view of a selectively engageable threading structure installed on the dolly, and further defines a cross-sectional line A-A.

FIG. 6C is the cross-sectional view taken along line A-A of FIG. 6B.

FIG. 6D is a cut-away top perspective view of a selectively engageable threading structure installed on the dolly, and that may be disengaged by rotating in the direction of arrow 65C-3.

FIG. 8A is a side view of three dollies carrying an off-centered load.

FIG. 8B is a side view of the three dollies of FIG. 8A without the load.

FIG. 10A is a side view of a three-dolly cart carrying an off-centered load.

FIG. 10B is a side view of the three-dolly cart of FIG. 10A without the load.

FIG. 16A is a side view of a two-dolly cart on stairs.

FIG. 16B is a top perspective view of a two-dolly cart on stairs.

FIG. 17A is a perspective view of a one-dolly cart with a crossmember and handles, carrying a load.

FIG. 17B is a side view of a one-dolly cart with a crossmember and handles, carrying a load.

FIG. 17C is a top perspective view of a one-dolly cart with a crossmember and handles, carrying a load.

6.0 DETAILED DESCRIPTION

Figure 1C:
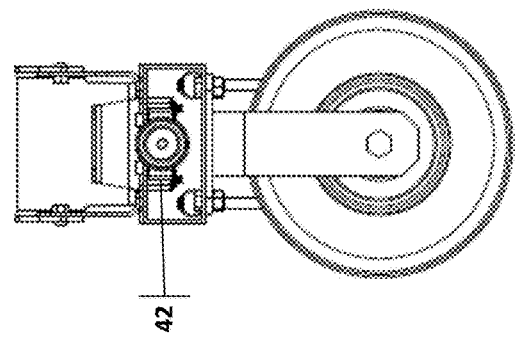
FIG. 1C is a side view of the dolly of FIG. 1A.
Figure 1A:
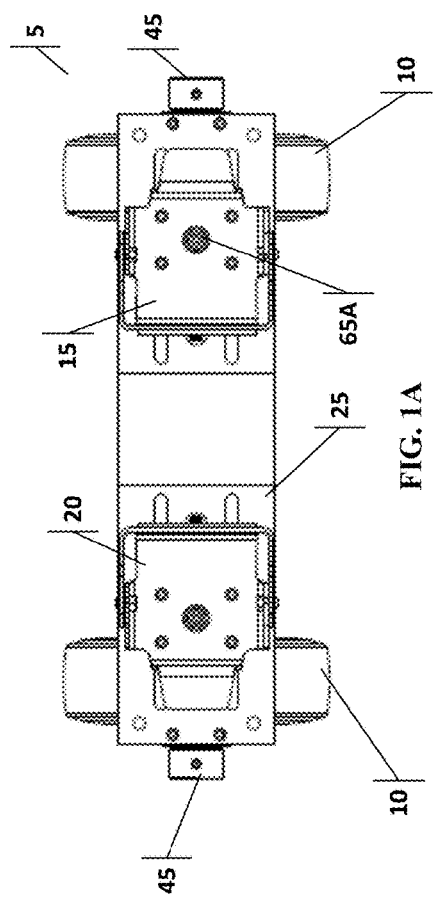
FIG. 1A is a top view of a dolly with two independently adjustable jaws.
Figure 1B:
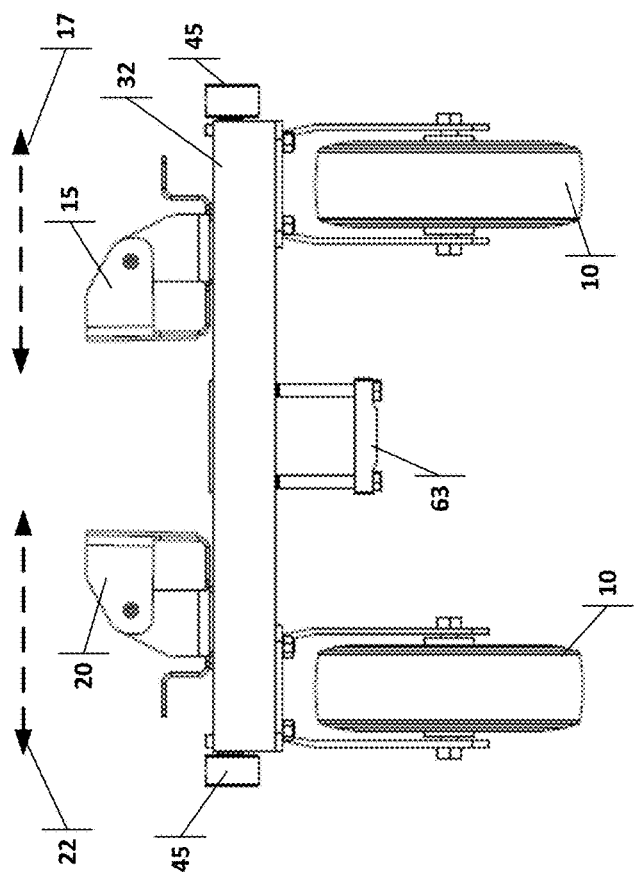
FIG. 1B is a front view of the dolly of FIG. 1A.
Figure 1D:
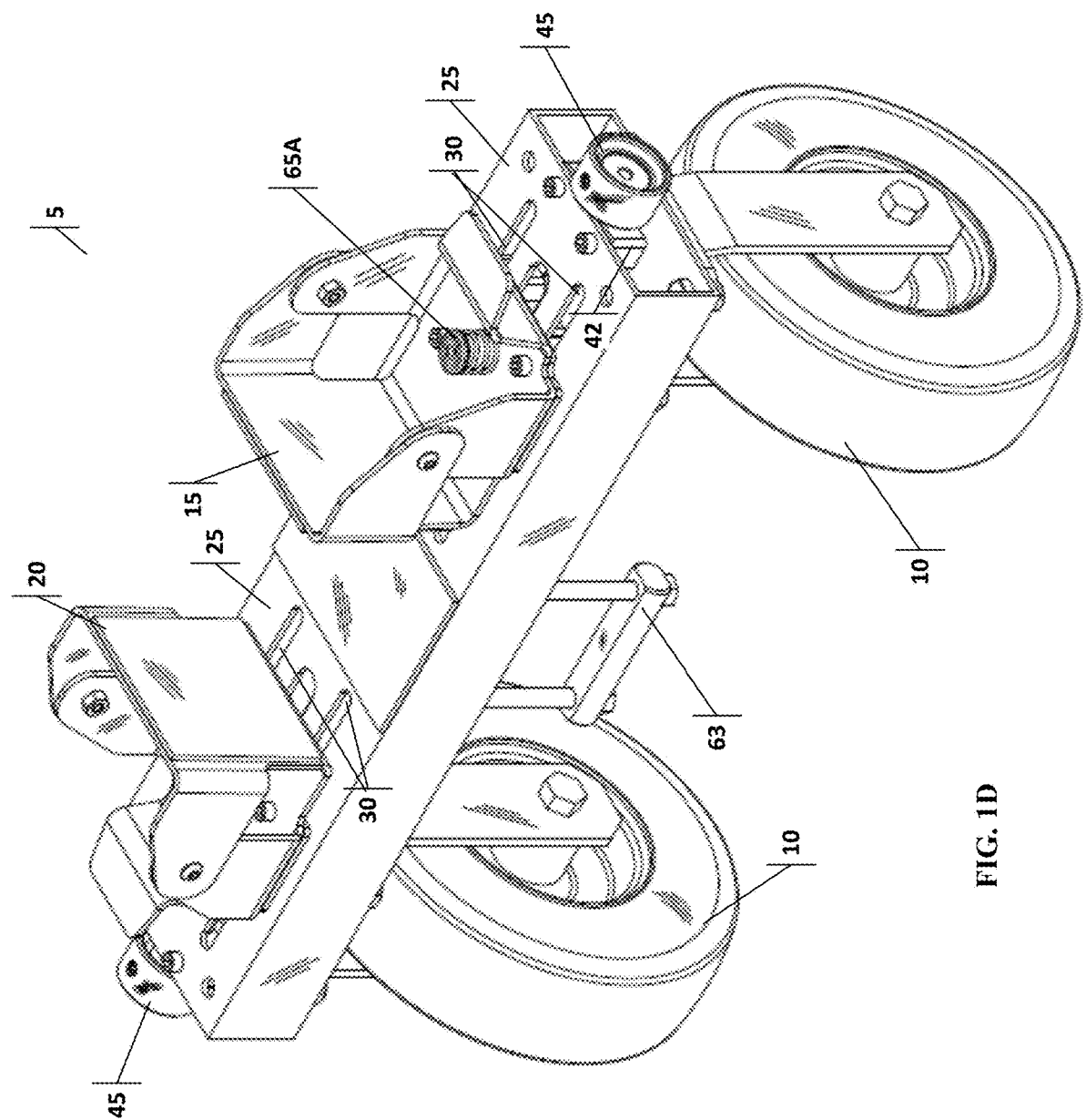
FIG. 1D is a top perspective view of the dolly of FIG. 1A.
Figure 1E:
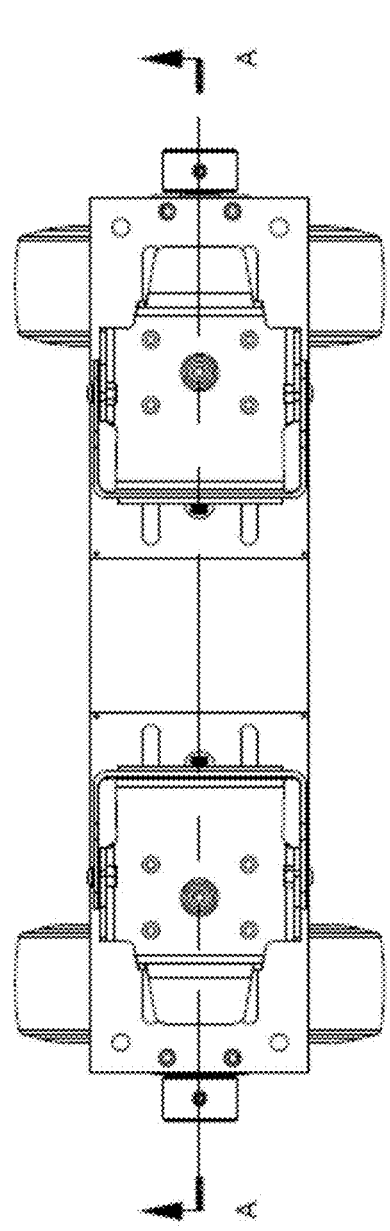
FIG. 1E is a top view of the dolly of FIG. 1A, denoted with the cross-sectional line A-A.
Figure 1F:
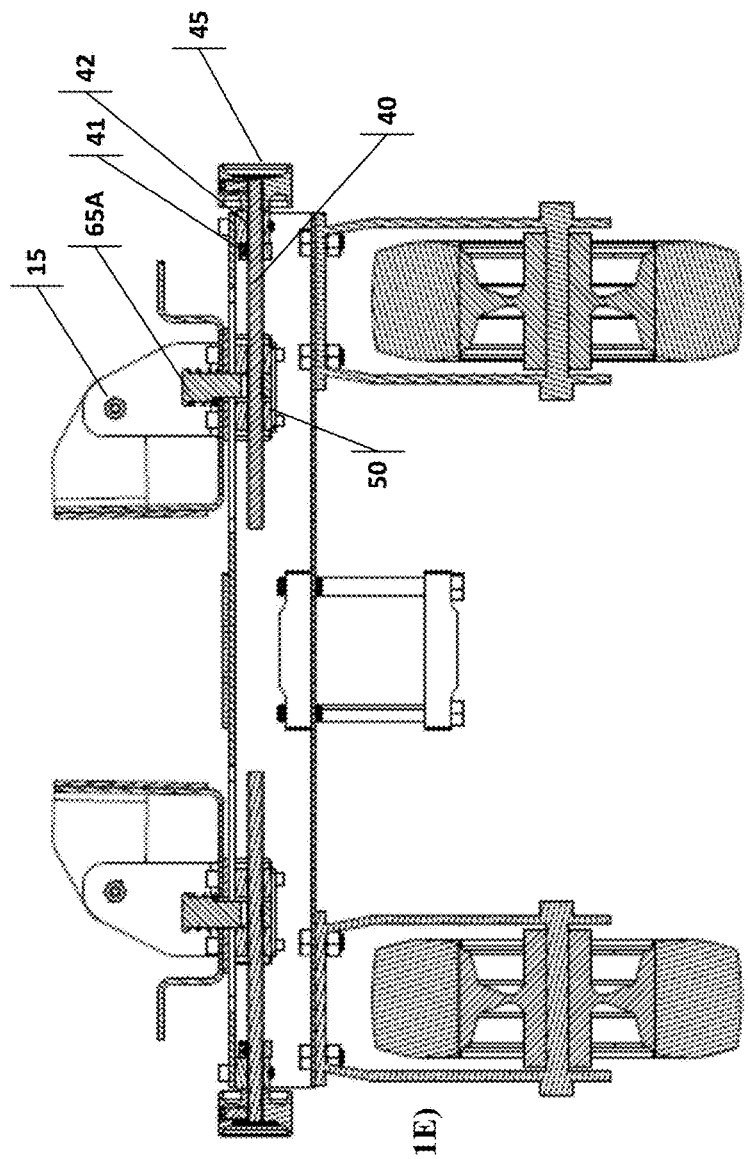
FIG. 1F is the cross-sectional view taken along line A-A of FIG. 1E.
Figure 1G:
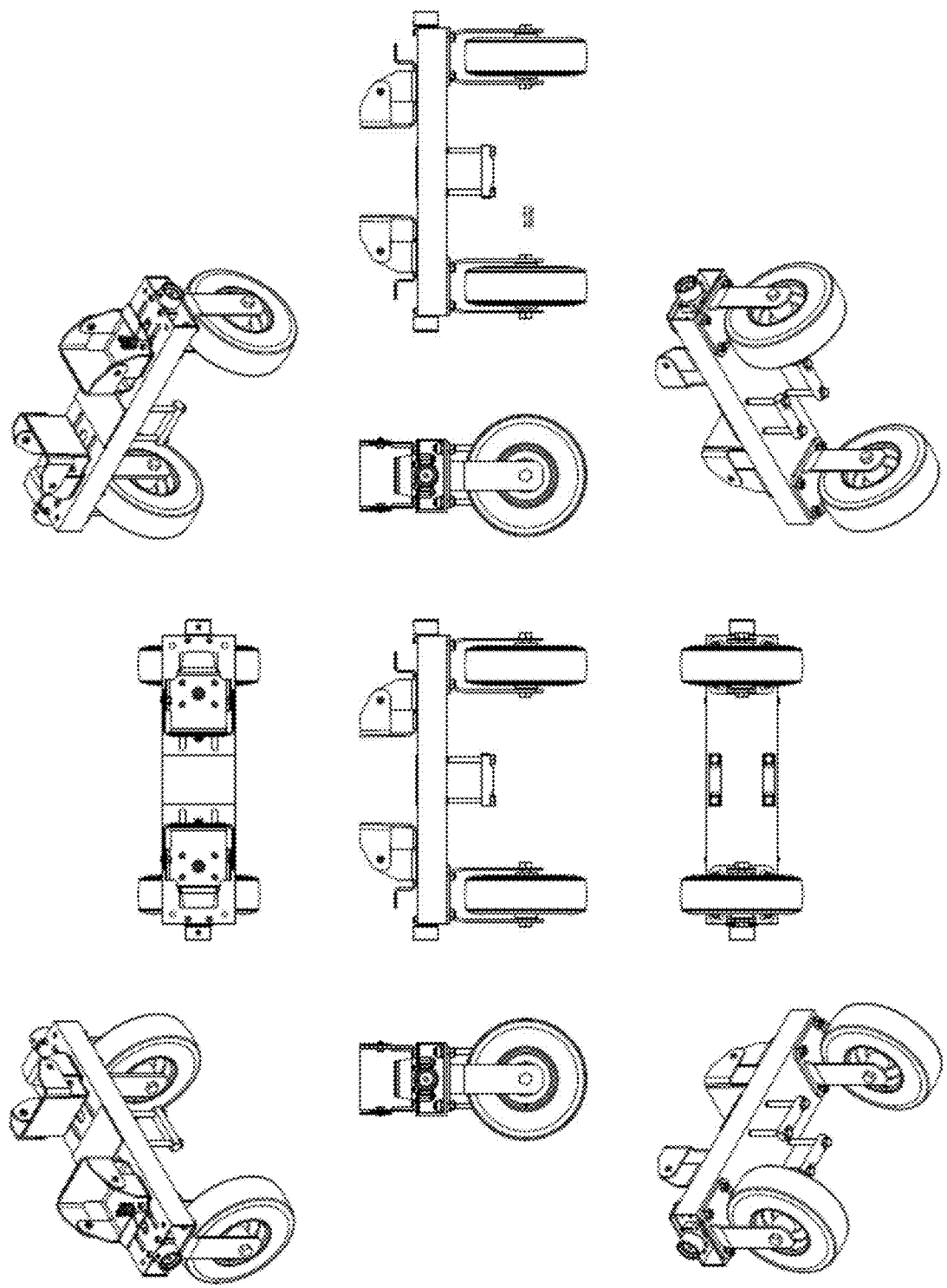
FIG. 1G shows various views of the dolly of FIG. 1A.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with attached figures and is provided for ease of reference, where like reference numerals designate corresponding features throughout the specification and figures:

Dolly 5
Non-Swivel Casters 10
First Slidable Jaw 15
Slide Movement of First Jaw 17
Fine-Tuned Slide Movement of First Jaw 17.1
Second Slidable Jaw 20
Slide Movement of Second Jaw 22
First Surface 25
Sliding Guide Channels 30
Slot 31
Caster/Jaw Support Member 32
Low-Friction Slide Member 35
Fasteners 37
Lower Jaw Assembly 38
Upper Jaw Assembly 39
Threaded Shaft 40
Shaft Collar 41
Shaft Support Block 42
Adjustment Knob 45
Lower Jaw Carriage 50
Second Surface 52
Carriage Guide Structures 55
Carriage Thread Plates 60
Receiver Hole 62
Crossmember Support 63
Selectively Engageable Threading Structure 65A
Spring 65A-1
Partially-Threaded Slide Block 65A-2
Thread Location 65A-3
Disengagement Motion 65A-4
Engagement Motion 65A-5
Flat Side 65A-6
Partially-Threaded Hole 65A-7
Selectively Engageable Threading Structure 65B
Spring 65B-1
Partially-Threaded Slide Block 65B-2
Thread Location 65B-3
Disengagement Motion 65B-4
Engagement Motion 65B-5
Flat Side 65B-6
Partially-Threaded Hole 65B-7
Position of Threaded Hole 65B-8
Selectively Engageable Threading Structure 65C
Partially-Threaded Rotating Block 65C-1
Thread Location 65C-2
Disengagement Motion 65C-3
Engagement Motion 65C-4
Partially-Threaded Hole 65C-5
First Region of Threaded Hole 65C-6
Second Region of Threaded Hole 65C-7
Keyed Hole 70
Hole 75
Hole 78
Dolly Center Line 80
Swivel Caster 85
Crossmember 90
Telescoping Crossmember 91
Adjustment Holes 91.1
Adjustment Peg 91.2
Crossmember with 90-degree bend 92
Handles 95
Off-centered Load 100
Centered Load 105
Cart (3-Dolly) 110
Load Plane 111
Forklift Forks 112
Cart (2-Dolly) 115
Load 120
Cart (1-Dolly) 125

FIGS. 1A-1G illustrate a dolly 5 with two independently adjustable jaws (15, 20) mounted to a caster/jaw support member 32. The two jaws can slide laterally in the directions of 22 and 17.

Casters 10 extend away from the caster/jaw support member 32. A crossmember support 63 may also extend from the caster/jaw support member 32, allowing multiple dollies to be connected together. Each jaw is connected to a lower jaw carriage 50 located within the caster/jaw support member 32. The lower jaw carriage 50 may also have carriage guide structures 55 that fit into sliding guide channels 30 formed into the caster/jaw support member 32. These structures 55 maintain the orientation of the jaw so that it can make solid contact with the load. Each jaw (15, 20) also has a selectively engageable threading structure 65A that engages a threaded shaft 40. An adjustment knob 45 is connected to the threaded shaft 40, such that rotating the knob 45 will slide the jaw along the first (top) surface of the caster/jaw support member 32 when the selectively engageable threading structure 65A is engaged with the threaded shaft 40. This is described in more detail below.

FIGS. 2A-3C detail the parts used for sliding the jaw. The various parts can be divided into the lower jaw assembly 38 and the upper jaw assembly 39.

The lower jaw assembly 38 contains an adjustment knob 45 that connects to the threaded shaft 40. The threaded shaft 40 travels through a shaft support block 42 connected to the caster/jaw support member 32, and a shaft collar 41 may be used to prevent the translational movement of the threaded shaft 40. Preferably, the shaft support block 42 is made of a low-friction material such as plastic to avoid having metal rubbing on metal. If, however, the shaft support block 42 is comprised of metal, a low-friction washer may be used.

The lower jaw carriage 50 has a receiver hole 62 through which the threaded shaft 40 travels. Carriage guide structures 55 may extend from the lower jaw carriage 50, and slide within sliding guide channels 30. The lower jaw carriage 50 slides along a second surface 52 of the caster/jaw support member 32. Preferably, the lower jaw carriage 50 is made of a low-friction material such as plastic to avoid having metal rubbing against metal. If, however, the lower jaw carriage 50 is comprised of metal, a low-friction slide member may be sandwiched between the lower jaw carriage 50 and the second surface 52.

Figure 2A:
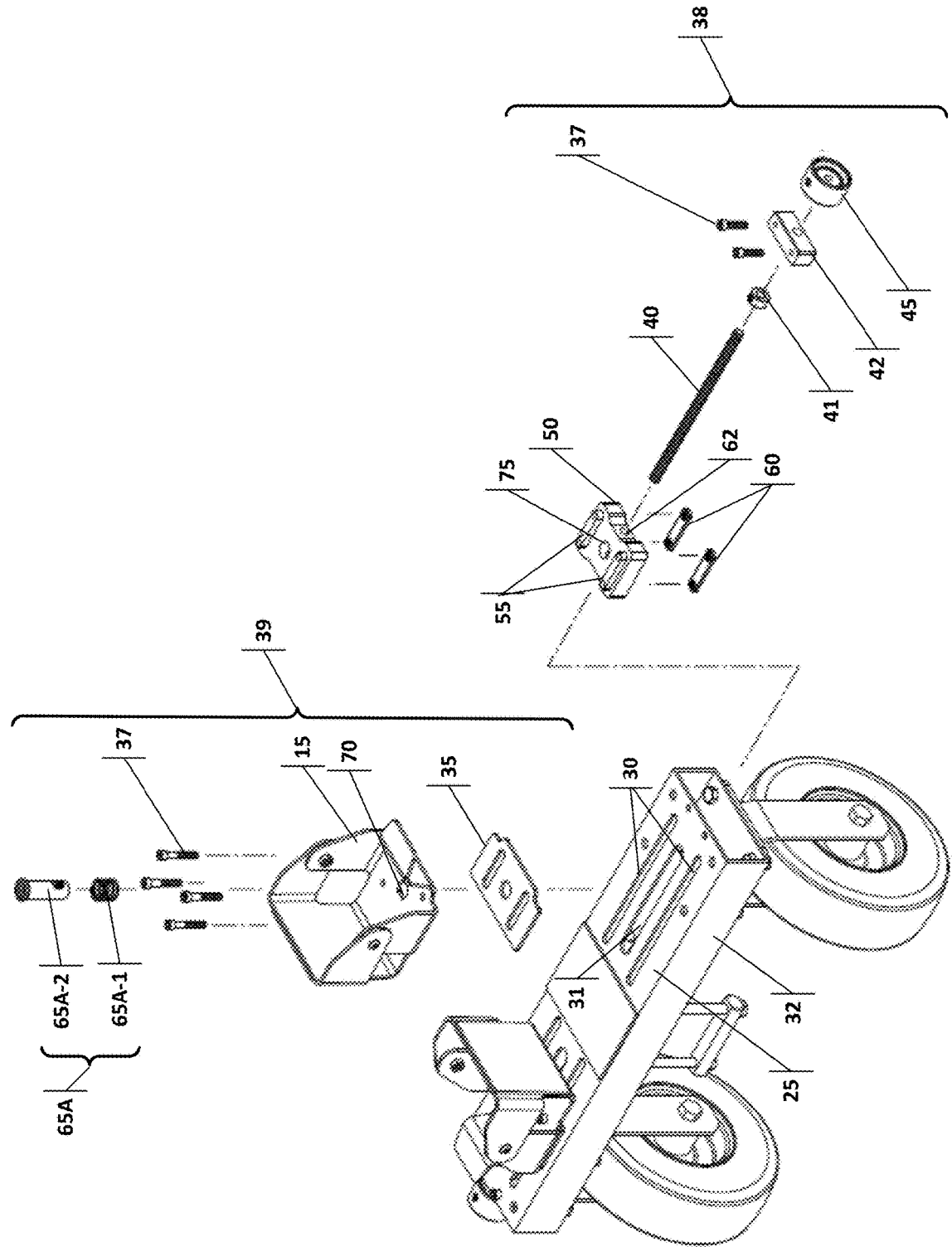
FIG. 2A is a top perspective exploded view of the dolly of FIG. 1A.
Figure 2B:
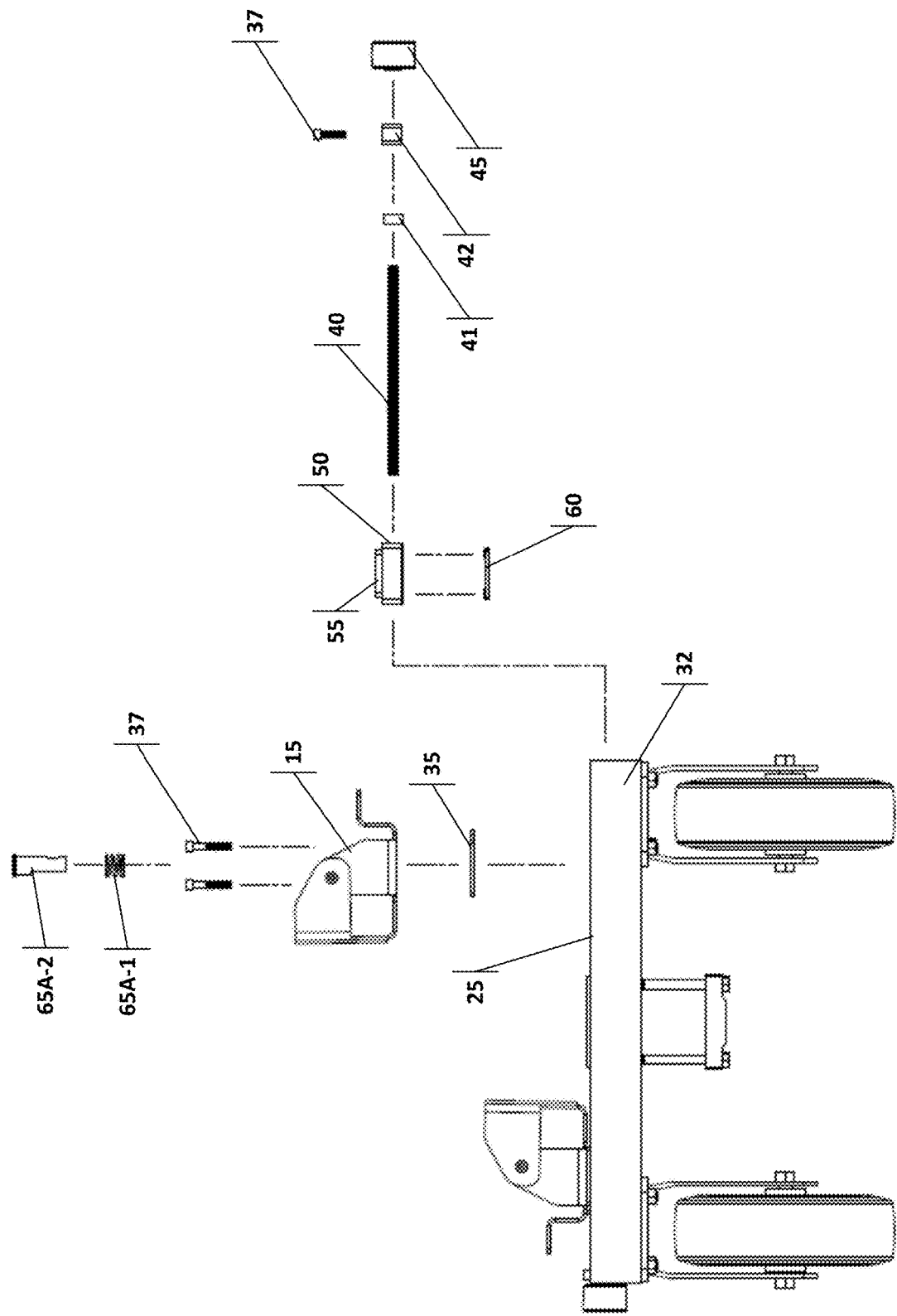
FIG. 2B is a front exploded view of the dolly of FIG. 1A.

The upper jaw assembly 39 contains a jaw 15 that mounts to the lower jaw carriage 50 using fasteners 37 and thread plates 60 (FIGS. 2A-2B). A low-friction slide member 35 may be sandwiched between the jaw 15 and the first surface 25 of the caster/jaw support member 32; this member 35 prevents metal rubbing against metal. The material of the low-friction slide member 35 may be, but is not limited to, plastic. A selectively engageable threading structure 65A comprised of a partially-threaded slide block 65A-2 and a spring 65A-1 completes the upper jaw assembly 39.

The slide block 65A-2 travels through the spring 65A-1, through the keyed hole 70 of jaw 15, through the low-friction slide member 35, through the caster/jaw support member 32 via slot 31 and into the lower jaw carriage 50 through hole 75. The threaded shaft 40 travels through the hole within the partially-threaded slide block 65A-2.

FIGS. 4A-4C illustrate in detail the selectively engageable threading structure 65A shown in FIGS. 1A-3C. Referencing FIG. 4A, the selectively engageable threading structure 65A pierces the slidable jaw 15 through keyed hole 70. The threading structure 65A is made of two components: a spring 65A-1 and a partially-threaded slide block 65A-2. Preferably, the slide block 65A-2 is non-circular (in FIG. 4A, the block 65A-2 has a flat side 65A-6) and complementary to the keyed hole 70, thus preventing the slide block 65A-2 from rotating within the hole 70 and maintaining alignment with the threaded shaft 40. The slide block 65A-2 is partially threaded, with the threads located on the lower side of the receiver hole 65A-7—at clock positions in the range of 3:00 to 9:00 (see location 65A-3). As shown in FIG. 4C at position 65A-8, the receiver hole 65A-7 has a larger diameter than the threaded shaft 40, allowing the threads to engage and disengage. The spring 65A-1 maintains the slide block 65A-2 in a topped-out position, which engages the threads of the slide block 65A-2 with the threaded shaft 40. The user can turn the adjustment knob 45, which turns the threaded shaft 40, sliding the lower jaw carriage 50 and the slidable jaw 15 laterally in the direction of arrow 17. Pushing the slide block 65A-2 disengages it from the threaded shaft 40, allowing the user to slide the jaw 15 without restriction from the threaded shaft 40. The same structures described here are used for the second sliding jaw 20 as well.

Figure 4D:
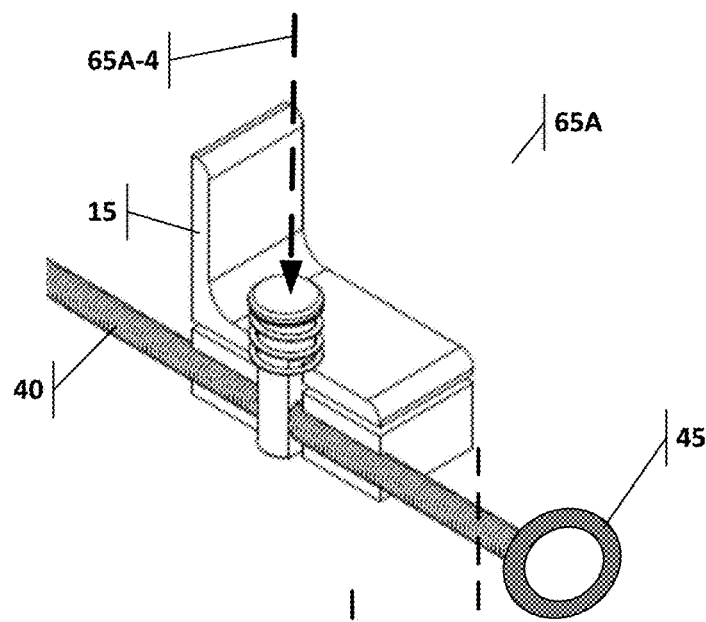
FIG. 4D illustrates the first step in gripping a load, wherein the selectively engageable threading structure is pushed so as to disengage it.
Figure 4E:
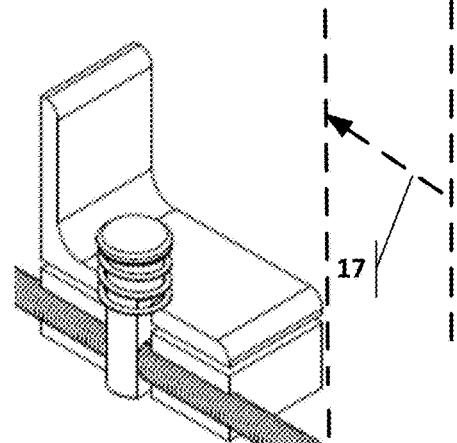
FIG. 4E illustrates the second step in gripping a load, wherein the jaw is slid laterally across the sliding platform towards the load.
Figure 4F:
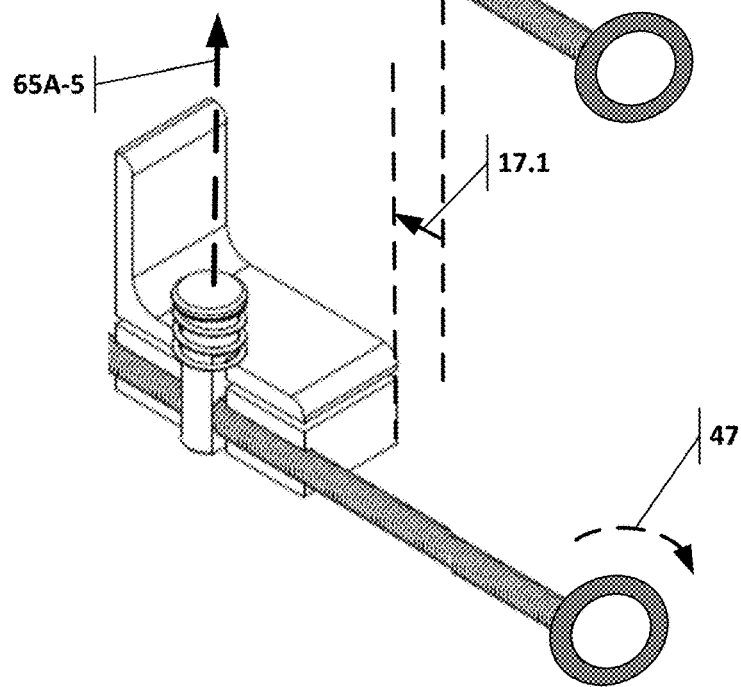
FIG. 4F illustrates the third step in gripping a load, wherein the selectively engageable threading structure is released so as to engage it, then the adjustment knob is rotated to fine-tune the lateral movement of the jaw across the sliding platform towards the load.

FIGS. 4D-4F illustrate the steps in gripping a load using the selectively engageable threading structure 65A just described. First, as shown in FIG. 4D, the selectively engageable threading structure 65A is pushed (arrow 65A-4) so as to disengage it from the threaded shaft 40. Second, the user slides the jaw 15 laterally across the sliding platform towards the load (arrow 17) as shown in FIG. 4E. Since the selectively engageable threading structure 65A is disengaged, the jaw 15 can slide without restriction from the threaded shaft 40. In the third step (FIG. 4F), the selectively engageable threading structure 65A is released (arrow 65A-5) so as to engage the threading structure 65A with the threaded shaft 40; then, the user rotates the adjustment knob 45 (arrow 47), which rotates the threaded shaft 40, pushing the jaw 15 in a fine-tuned lateral movement 17.1. The user can rotate the adjustment knob 45 until the user is satisfied that the load is properly secured. To release the load, the user may rotate the adjustment knob 45 in the reverse direction, and/or the user may disengage the selectively engageable threading structure 65A.

FIGS. 5A-5C illustrate in detail an alternative selectively engageable threading structure 65B. Referencing FIG. 5A, the selectively engageable threading structure 65B pierces the slidable jaw 15 through keyed hole 70. The threading structure 65B is made of two components: a spring 65B-1, and a partially-threaded slide block 65B-2. Preferably, the slide block 65B-2 is non-circular (in FIG. 5A, the block 65B-2 has a flat side 65B-6) and complementary to the keyed hole 70, thus preventing the slide block 65B-2 from rotating within the hole 70 while maintaining the alignment with the threaded shaft 40. The slide block 65B-2 is partially threaded, with the threads located on the upper side of the receiver hole 65B-7—at clock positions in the range of 9:00 to 3:00 (see location 65B-3). As shown in FIG. 5C at position 65B-8, the receiver hole 65B-7 has a larger diameter than the threaded shaft 40, allowing the threads to engage and disengage. The spring 65B-1 maintains the slide block 65B-2 in a bottomed-out position, which engages the threads of the slide block 65B-2 with the threaded shaft 40. The user can turn the adjustment knob 45, which turns the threaded shaft 40, sliding the lower jaw carriage 50 and the slidable jaw 15 laterally in the direction of arrow 17. Pulling the slide block 65B-2 disengages it from the threaded shaft 40, allowing the user to slide the jaw 15 without restriction from the threaded shaft 40.

Figure 5D:
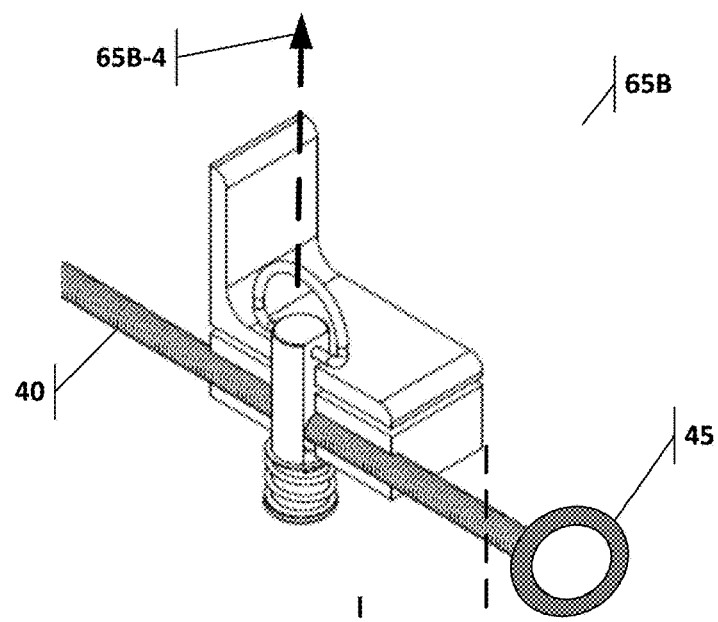
FIG. 5D illustrates the first step in gripping a load, wherein the selectively engageable threading structure is pulled so as to disengage it.
Figure 5E:
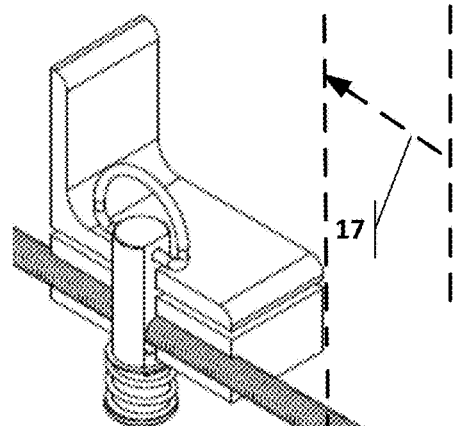
FIG. 5E illustrates the second step in gripping a load, wherein the jaw is slid laterally across the sliding platform towards the load.
Figure 5F:
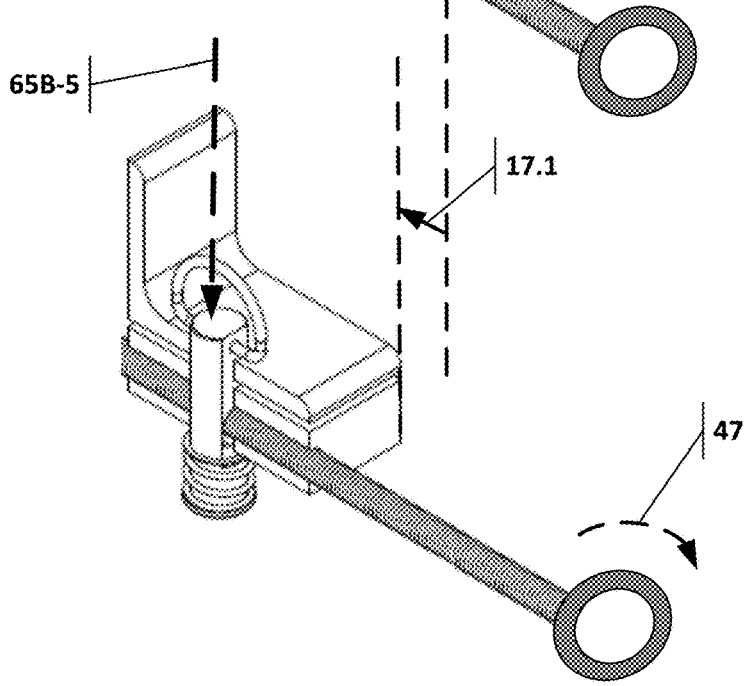
FIG. 5F illustrates the third step in gripping a load, wherein the selectively engageable threading structure is released so as to engage it, then the adjustment knob is rotated to fine-tune the lateral movement of the jaw across the sliding platform towards the load.

FIGS. 5D-5F illustrate the steps in gripping a load using the selectively engageable threading structure 65B just described. First, as shown in FIG. 5D, the selectively engageable threading structure 6B is pulled (arrow 65B-4) so as to disengage it from the threaded shaft 40. Second, the user slides the jaw 15 laterally across the sliding platform towards the load (arrow 17) as shown in FIG. 5E. Since the selectively engageable threading structure 65B is disengaged, the jaw 15 can slide without restriction from the threaded shaft 40. In the third step (FIG. 5F), the selectively engageable threading structure 65B is released (arrow 65B-5) so as to engage the threading structure 65B with the threaded shaft 40; then the user rotates the adjustment knob 45 (arrow 47), which rotates the threaded shaft 40, pushing the jaw 15 in a fine-tuned lateral movement 17.1. The user can rotate the adjustment knob 45 until the user is satisfied that the load is properly secured. To release the load, the user may rotate the adjustment knob 45 in the reverse direction, and/or the user may disengage the selectively engageable threading structure 65B.

Figure 6E:
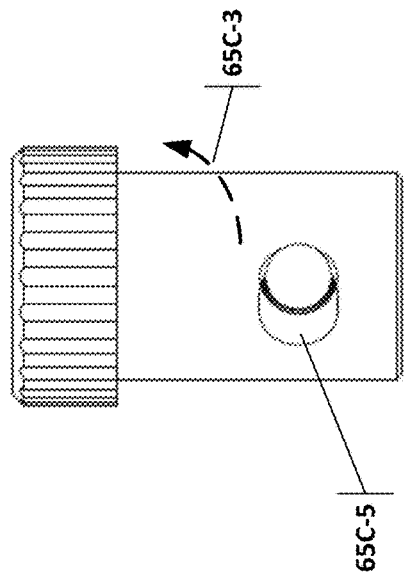
FIG. 6E is the partially-threaded rotating block of the selectively engageable threading structure of FIG. 6A, and further defines a cross-sectional line A-A.
Figure 6G:
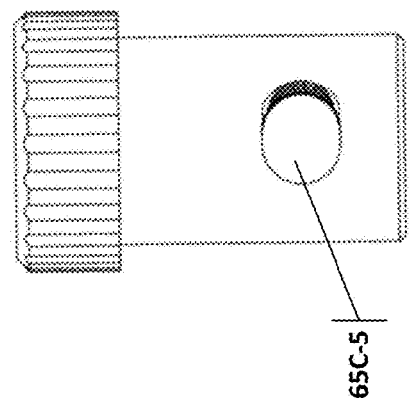
FIG. 6G is a front view of the partially-threaded rotating block of the selectively engageable threading structure of FIG. 6A in the engaged position.
Figure 6F:
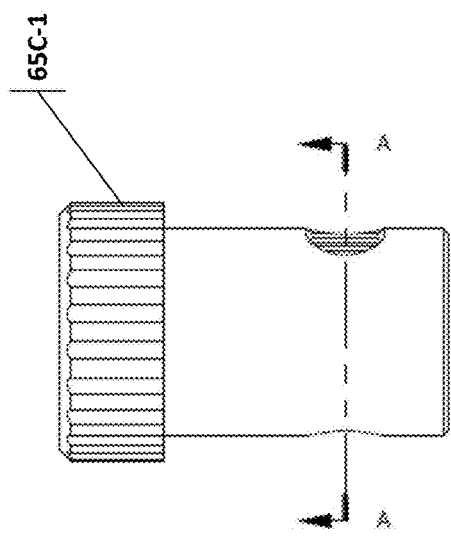
FIG. 6F is the cross-sectional view taken along line A-A of FIG. 6E.
Figure 6H:
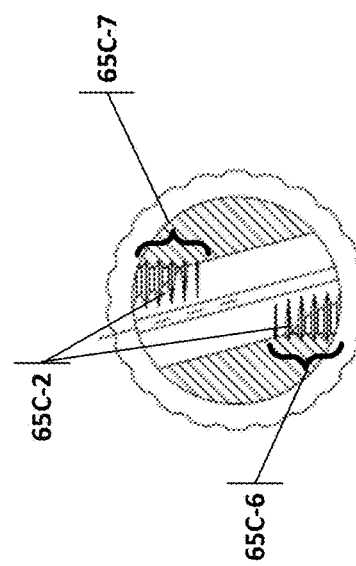
FIG. 6H is a front view of the partially-threaded rotating block of the selectively engageable threading structure of FIG. 6A in the disengaged position.

The two selectively engageable threading structures describe above (65A, 65B) use a translational movement of the sliding block to engage and disengage with the threaded shaft 40. Shown in FIGS. 6A-6H is a selectively engageable threading structure 65C that is engaged and disengaged by rotational movement. The selectively engageable threading structure 65C pierces the slidable jaw 15 through hole 78. The threading structure 65C is made of a partially-threaded rotating block 65C-1 that has threads located on one side at a first region 65C-6 (clock positions in the range of 6:00 to 12:00) and on the other side in a second region 65C-7 (clock positions in the range of 12:00 to 6:00; see locations 65C-2). As shown in FIG. 6H, the receiver hole 65C-5 has a larger diameter than the threaded shaft 40, allowing the threads to engage and disengage. The user can rotate (arrow 65C-3) the rotating block 65C-1 to engage the threads of the rotating block 65C-1 with the threaded shaft 40. The user can then turn the adjustment knob 45, which turns the threaded shaft 40, sliding the lower jaw carriage 50 and the slidable jaw 15 laterally in the direction of arrow 17. Rotating the rotating block 65C-1 in the opposite direction disengages it from the threaded shaft 40, allowing the user to slide the jaw 15 without restriction from the threaded shaft 40.

Figure 6I:
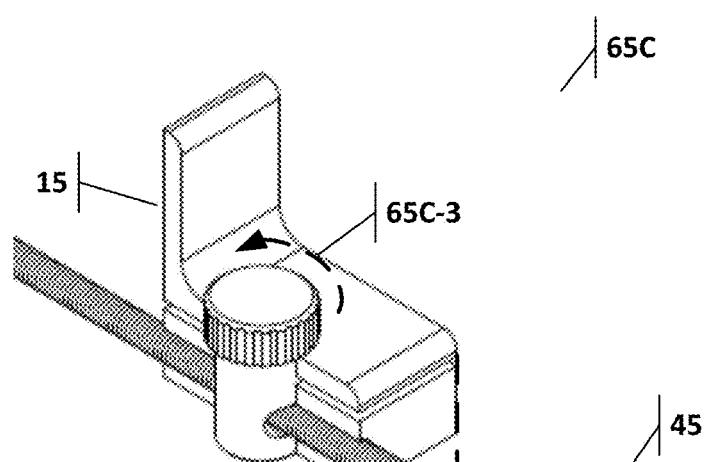
FIG. 6I illustrates the first step in gripping a load, wherein the selectively engageable threading structure is rotated so as to disengage it.
Figure 6J:
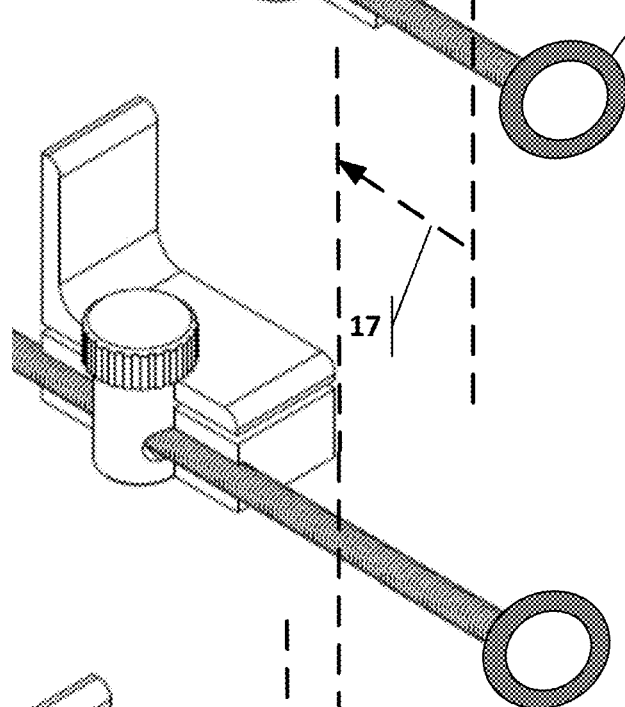
FIG. 6J illustrates the second step in gripping a load, wherein the jaw is slid laterally across the sliding platform towards the load.
Figure 6K:
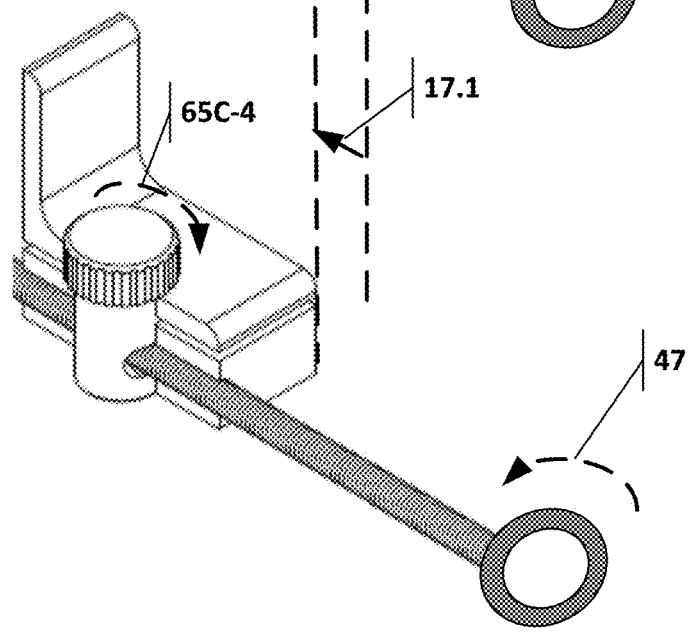
FIG. 6K illustrates the third step in gripping a load, wherein the selectively engageable threading structure is released so as to engage it, then the adjustment knob is rotated to fine-tune the lateral movement of the jaw across the sliding platform towards the load.
Figure 7B:
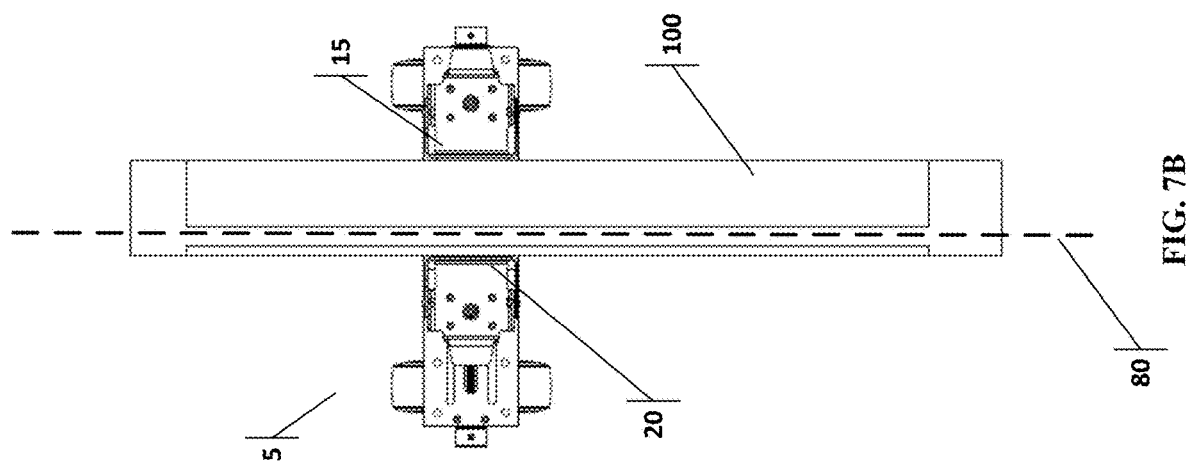
FIG. 7B is a top view of the dolly carrying an off-centered load.
Figure 7A:
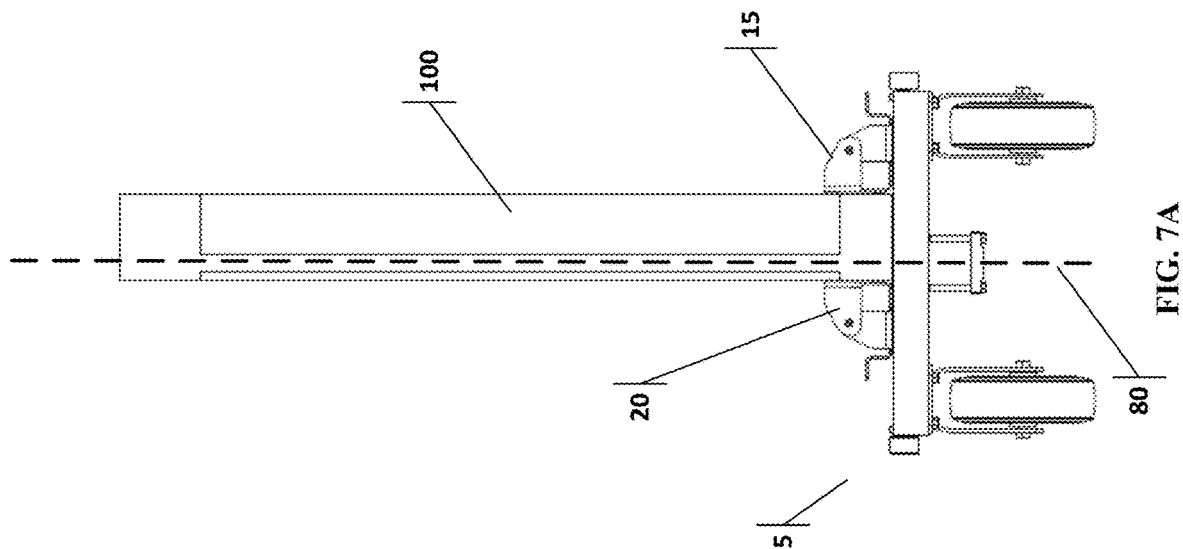
FIG. 7A is a front view of the dolly carrying an off-centered load.
Figure 7E:
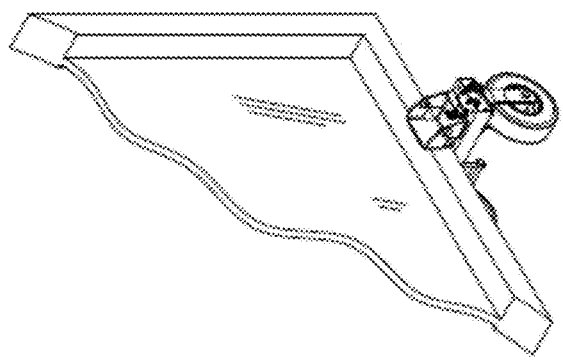
FIG. 7E is a top perspective view of the dolly carrying an off-centered load.
Figure 7F:
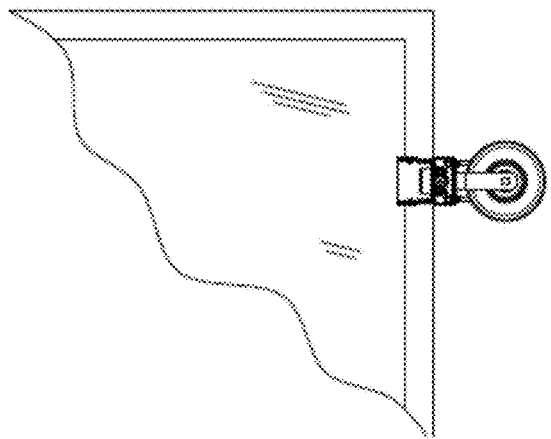
FIG. 7F is a side view of the dolly carrying an off-centered load.
Figure 7C:
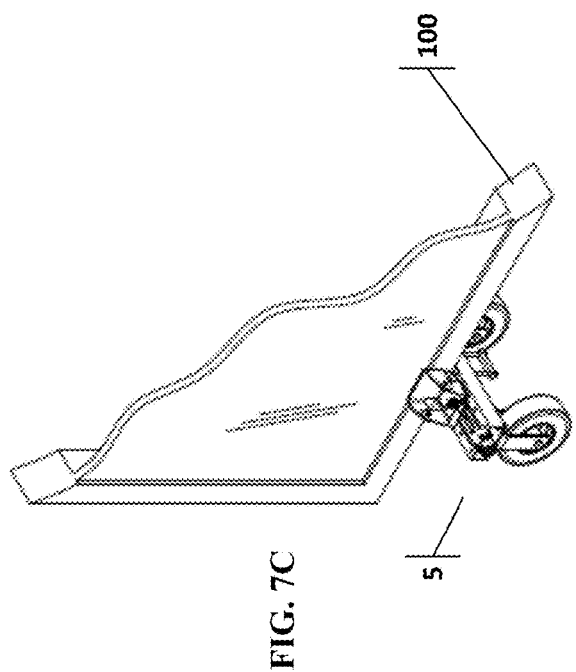
FIG. 7C is a top perspective view of the dolly carrying an off-centered load.
Figure 7D:
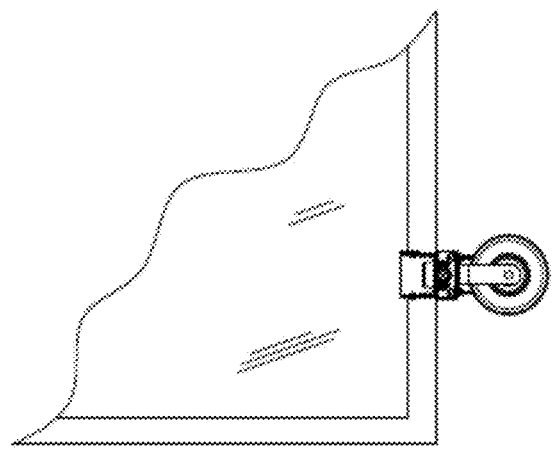
FIG. 7D is a side view of the dolly carrying an off-centered load.

FIGS. 6I-6K illustrate the steps in gripping a load using the selectively engageable threading structure 65C just described. First, as shown in FIG. 6I, the selectively engageable threading structure 65C is rotated (arrow 65C-3) so as to disengage it from the threaded shaft 40. Second, the user slides the jaw 15 laterally across the sliding platform towards the load (arrow 17) as shown in FIG. 6J. Since the selectively engageable threading structure 65C is disengaged, the jaw 15 can slide without restriction from the threaded shaft 40. In the third step (FIG. 6K), the selectively engageable threading structure 65C is rotated (arrow 65C-4) so as to engage the threading structure 65C with the threaded shaft 40; then, the user rotates the adjustment knob 45 (arrow 47), which rotates the threaded shaft 40, pushing the jaw 15 in a fine-tuned lateral or slide movement 17.1. The user can rotate the adjustment knob 45 until the user is satisfied that the load is properly secured. To release the load, the user may rotate the adjustment knob 45 in the reverse direction, and/or the user may disengage the selectively engageable threading structure 65C.

Because the dolly 5 is made up of two independently slidable jaws (15, 20), it can efficiently carry an off-centered load 100, as shown in FIGS. 7A-7F. The off-centered load 100 is shown as a large window with the glass pane positioned towards the left edge of the frame. If this load 100 were loaded on a dolly from the prior art without accounting for the weight imbalance, the dolly from the prior art could topple over and damage the load. Instead, using dolly 5, the second jaw 20 is positioned closer to the dolly centerline 80 than to the first jaw 15. This configuration places the load's center of mass along the dolly centerline 80, resulting in a load that is stable and easily moveable. If the off-centered load 100 is large, then multiple dollies 5 may be used, as shown in FIGS. 8A and 8B. The outside dollies may use swivel casters 85, while the inside dolly may use a non-swivel caster 10.

Figure 9:
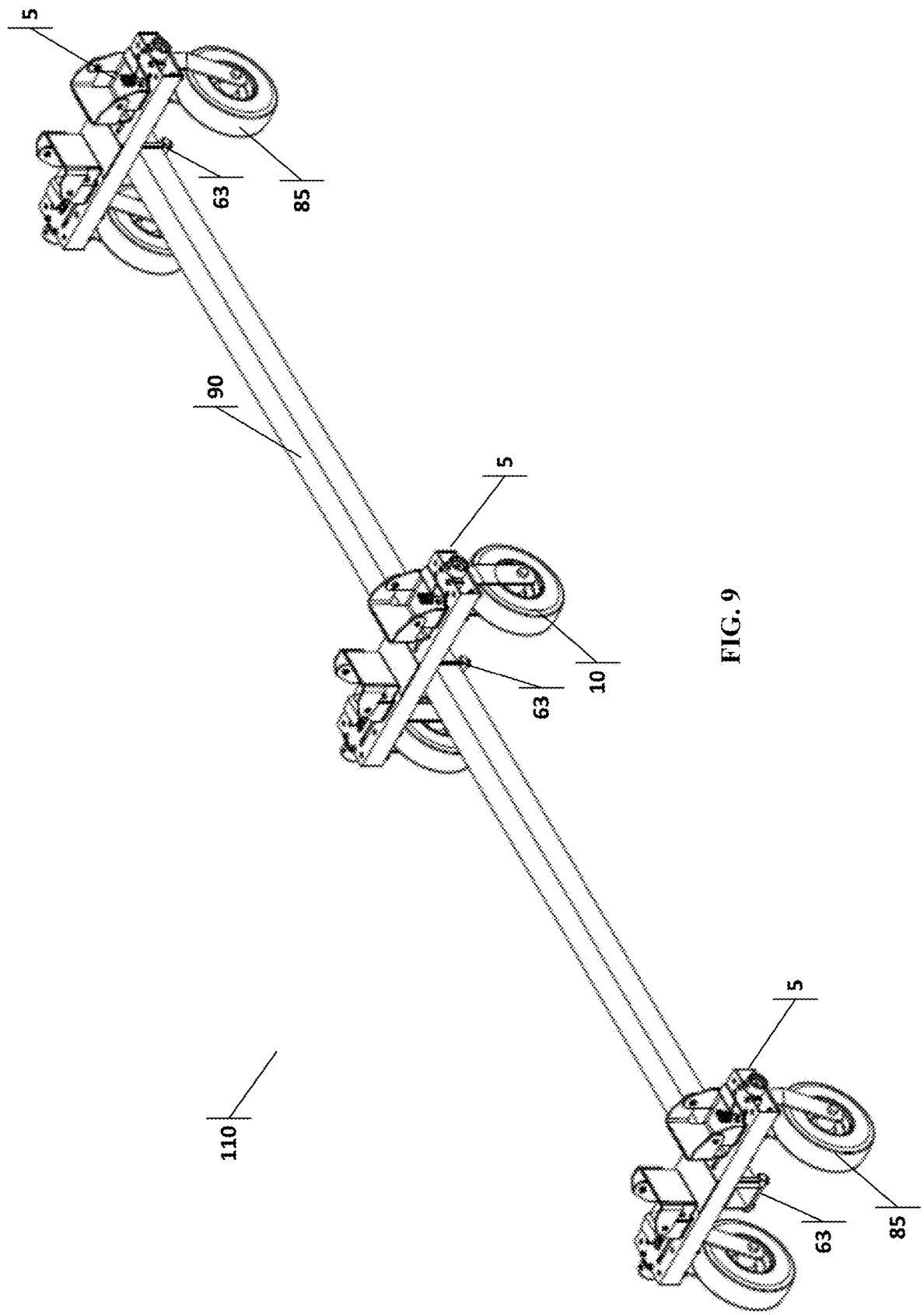
FIG. 9 is a top perspective view of a three-dolly cart with a crossmember.
Figure 11:
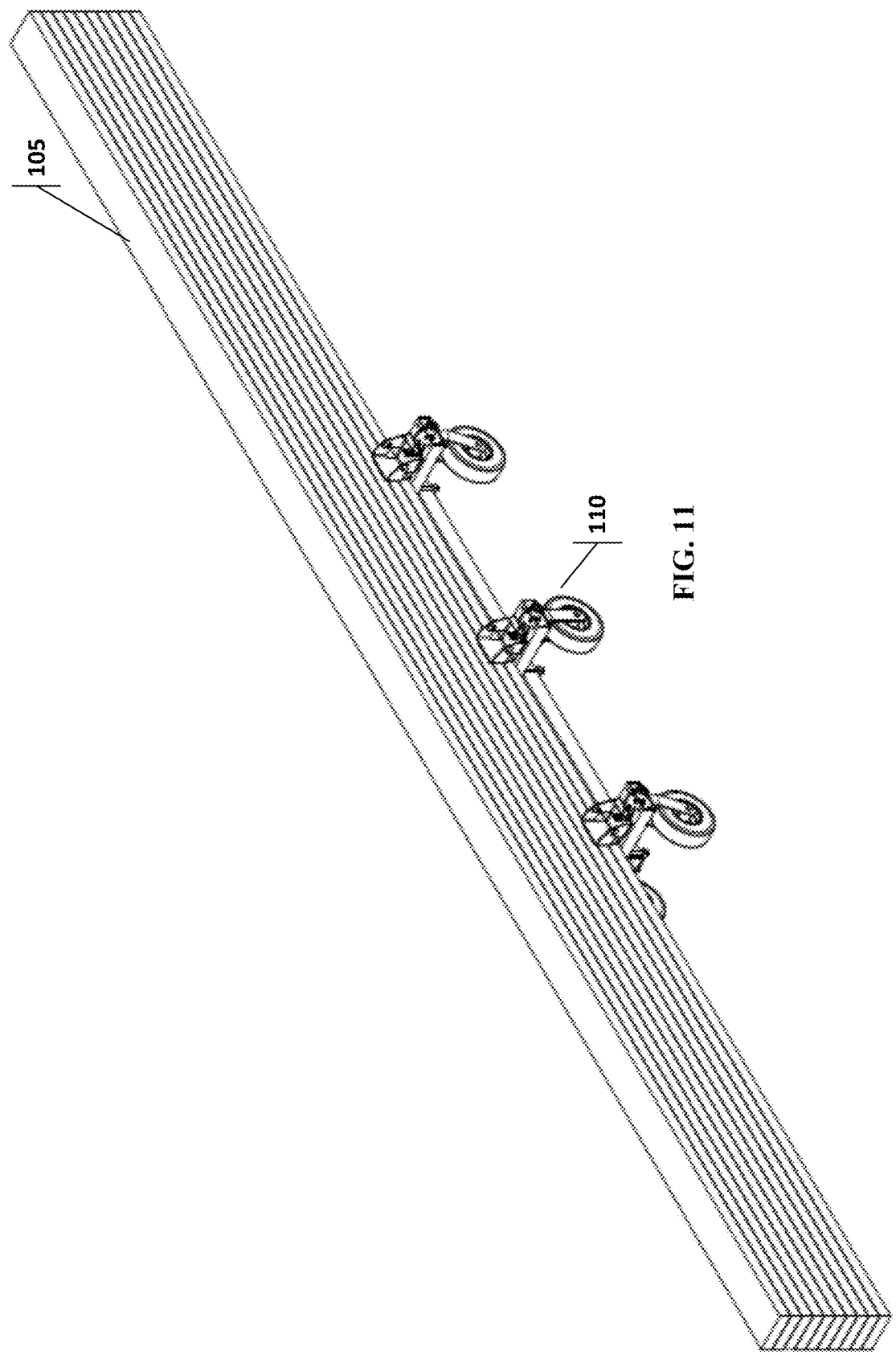
FIG. 11 is a top perspective view of a three-dolly cart with a crossmember carrying a centered load.
Figure 12:
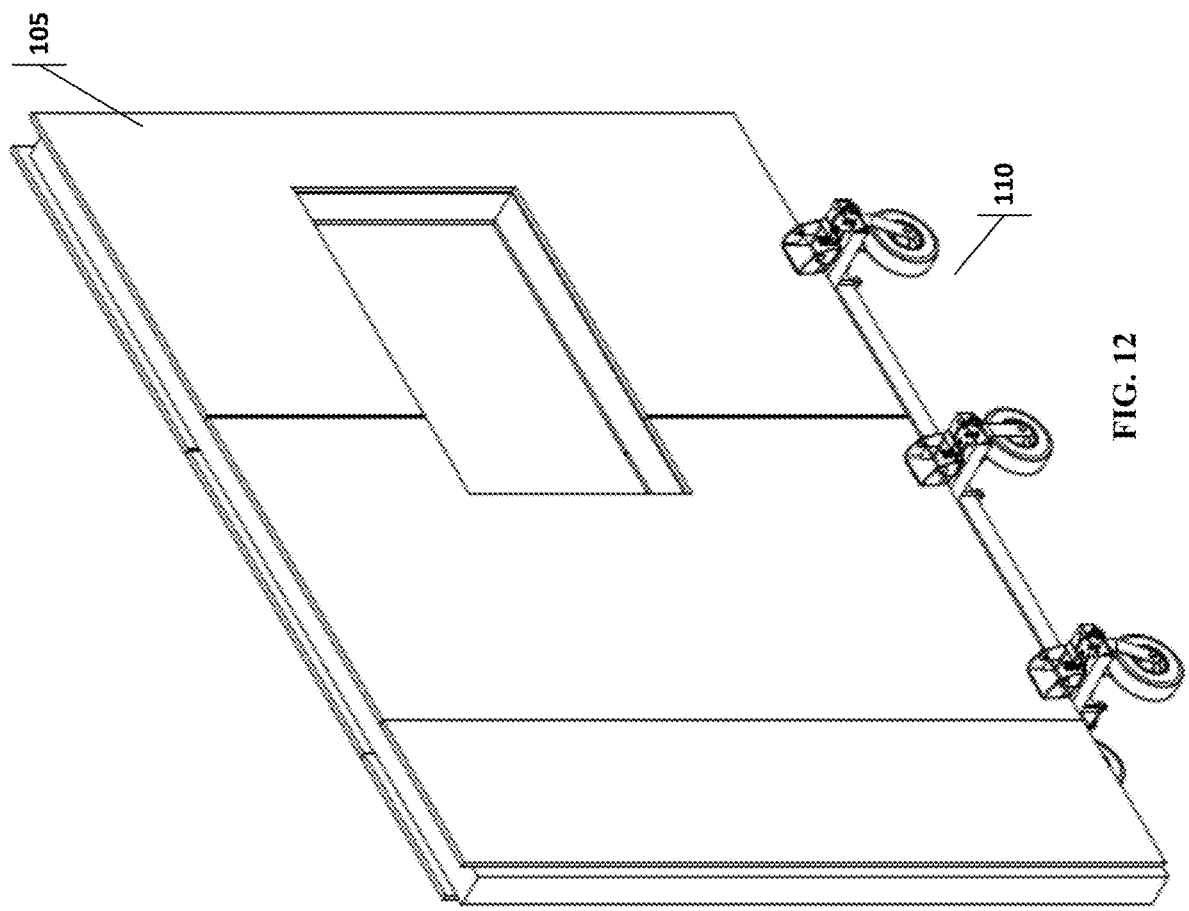
FIG. 12 is a top perspective view of a three-dolly cart with a crossmember carrying a centered load.

To provide more stability and rigidity, a crossmember 90 may be fixed to the crossmember support 63 on multiple dollies 5. Cart 110 in FIGS. 9 and 10A is comprised of three dollies 5 connected to each other by crossmember 90. The three-dolly cart 110 can carry an off-centered load 100, as shown in FIG. 10A. As shown in FIGS. 11 and 12, the same cart 110 may also carry a centered load 105 (where both jaws are positioned equidistance from the dolly centerline. Preferably as shown in FIGS. 10A and 10B, the crossmember 90 is mounted to the dolly 5 so as to create a space between the load plane 111 and the crossmember 90 to allow sufficient clearance for the forks 112 of a lifting apparatus such as, but not limited to, a forklift or a wall jack.

Figure 13C:
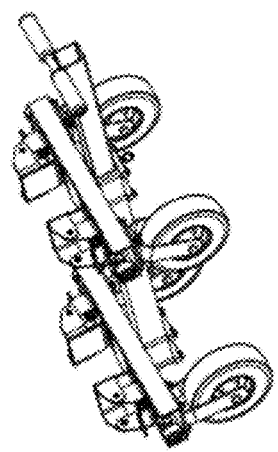
FIG. 13C is a top perspective view of a two-dolly cart with a crossmember and handles.
Figure 13B:
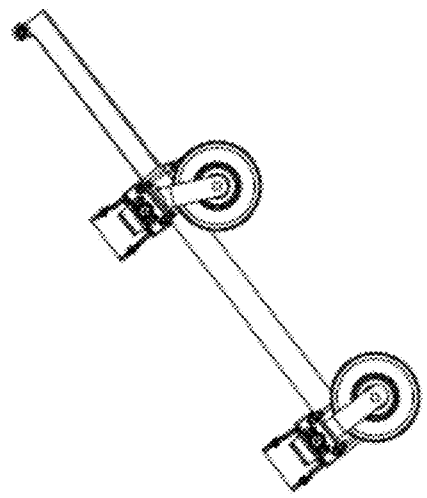
FIG. 13B is a side view of a two-dolly cart with a crossmember and handles.
Figure 13D:
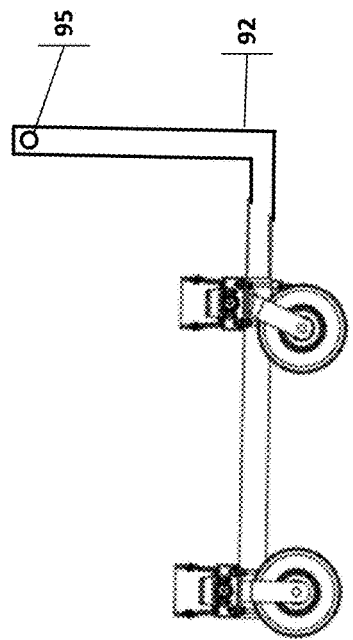
FIG. 13D is a side view of a two-dolly cart with a crossmember having a 90-degree bend and handles
Figure 13A:
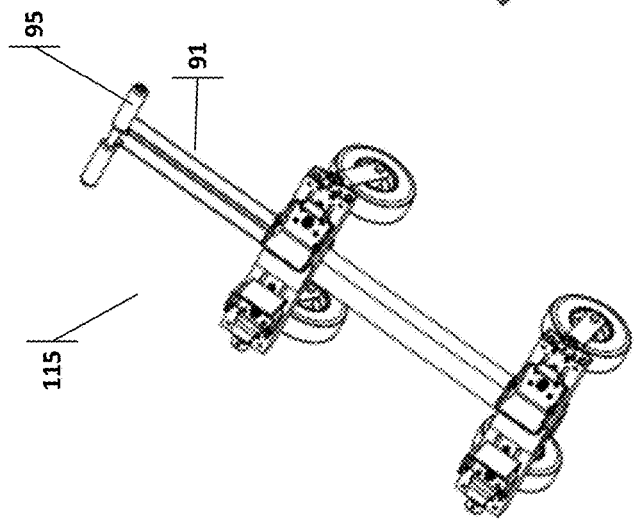
FIG. 13A is a perspective view of a two-dolly cart with a crossmember and handles.
Figure 13E:
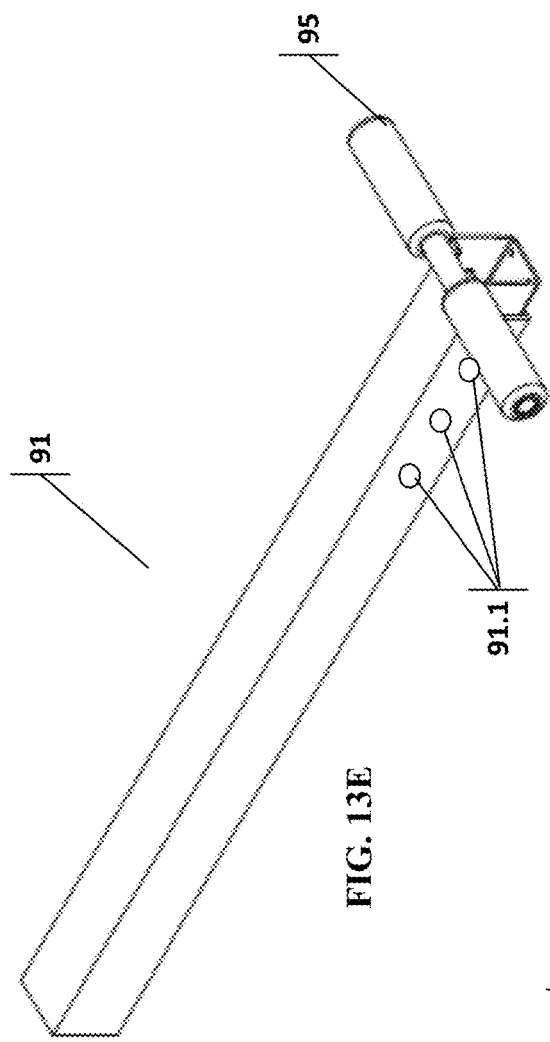
FIG. 13E illustrates the telescoping crossmember in a collapsed configuration.
Figure 13F:
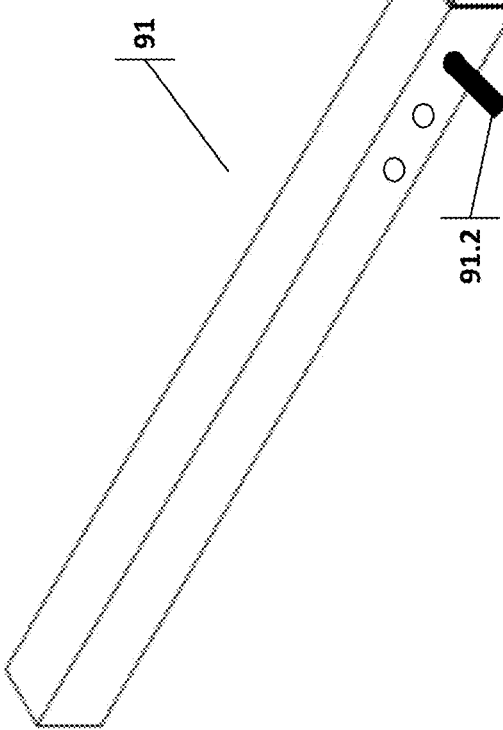
FIG. 13F illustrates the telescoping crossmember in an extended configuration.

Shown in FIGS. 13A-13C is a two-dolly cart 115 with a telescoping crossmember 91 connecting the dollies and a handle 95 at the end of the crossmember 90. The handle allows the user to maneuver the cart 115 into a more comfortable upright position when the cart is unloaded or "empty". FIG. 13D illustrates a crossmember 92 with a 90-degree bend, allowing a user to maintain both dollies in contact with the floor while pushing or pulling the cart from an upright position. FIGS. 13E and 13F illustrate the telescoping crossmember 91, which may include a locking mechanism such as an adjustment holes 91.1, and an adjustment peg 91.2 that locks the telescoping crossmember 91 to a specific length. The telescoping crossmember 91 may be placed in between two dollies 5, allowing a user to easily adjust the distance between the dollies 5 to accommodate a load. Alternatively, a non-telescoping crossmember may be used between dollies 5, and the distance can be adjusted by loosening the fasteners on the crossmember support 63, sliding the crossmember to the appropriate length and tightening the fasteners.

Figure 14C:
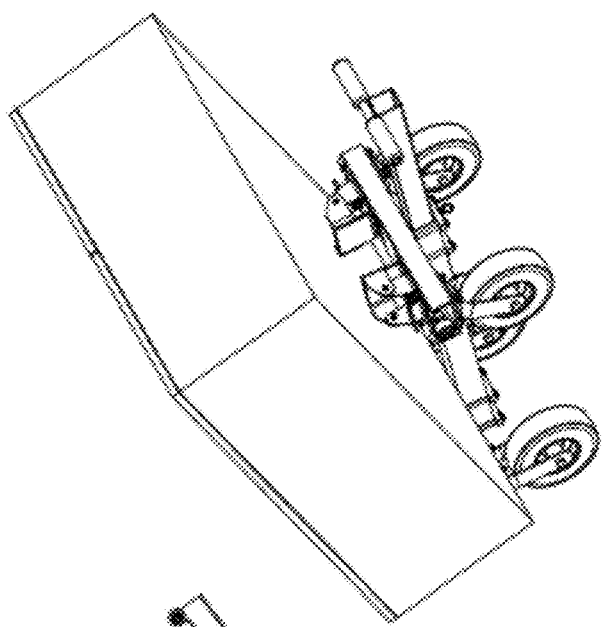
FIG. 14C is a top perspective view of a two-dolly cart carrying a load.
Figure 14B:
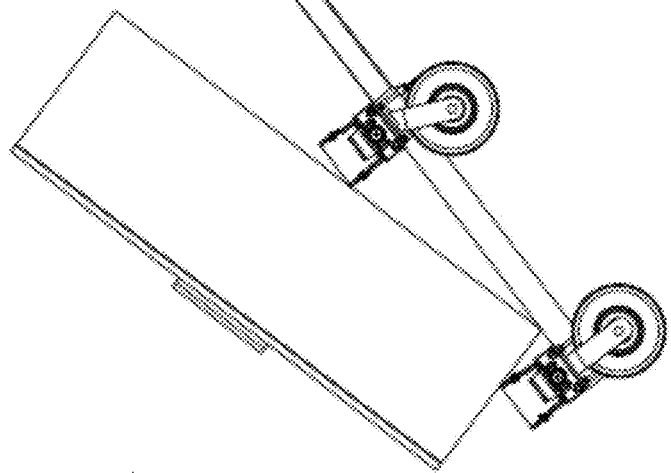
FIG. 14B is a side view of a two-dolly cart carrying a load.
Figure 14A:
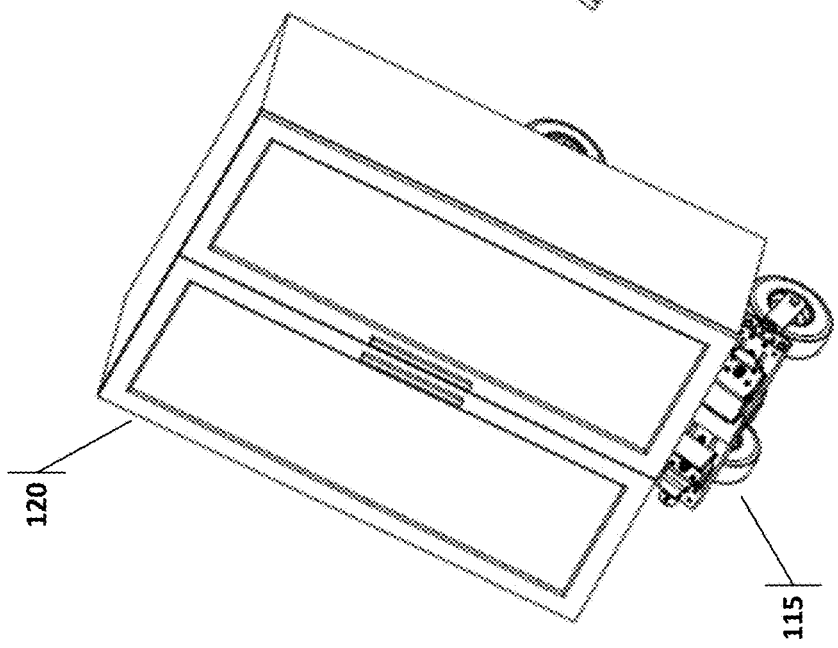
FIG. 14A is a perspective view of the two-dolly cart carrying a load.
Figure 15C:
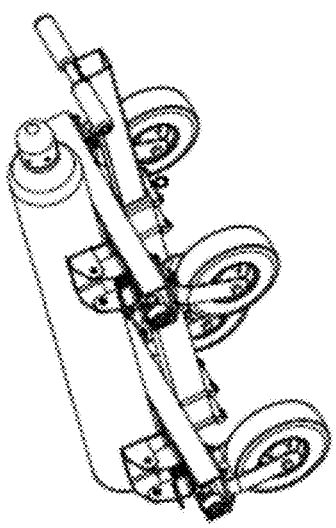
FIG. 15C is a top perspective view of a two-dolly cart carrying a centered load between the dolly slidable jaws.
Figure 15B:
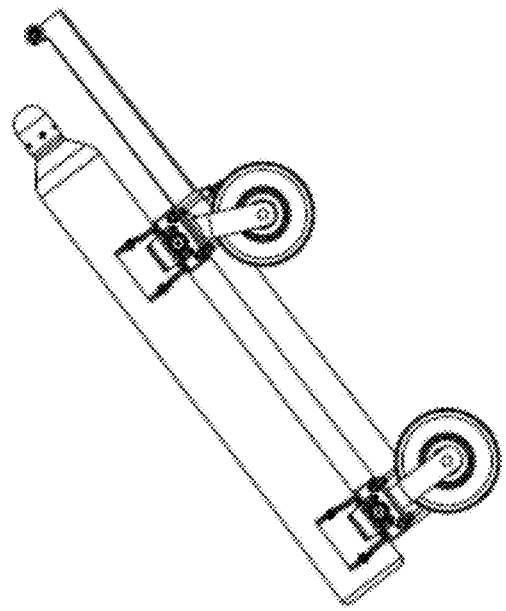
FIG. 15B is a side view of a two-dolly cart carrying a centered load between the dolly slidable jaws.
Figure 15A:
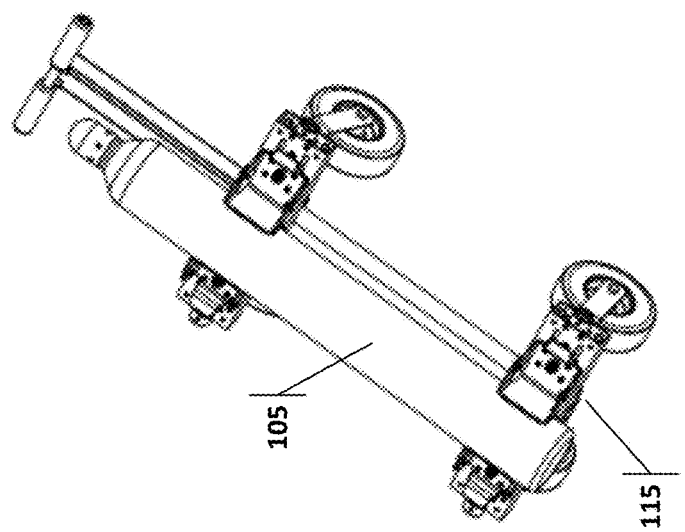
FIG. 15A is a perspective view of the two-dolly cart carrying a centered load between the dolly slidable jaws.

FIGS. 14A-14C illustrate the two-dolly cart 115 carrying a load 120 (a cabinet). The slidable jaws of the individual dollies are not gripping with the load 120; rather, the load 120 is resting on the jaws. FIGS. 15A-15C illustrate the two-dolly cart 115 carrying a centered load 105 (a cylindrical tank). Here, the slidable jaws of the dollies are gripping with the load 105. Jaws 15 and 20 could be shaped to hold loads of different shapes such as this round cylindrical tank. Alternatively, pads could be added to the existing jaws 15 and 20 that would be suitable to hold loads of different shapes. FIGS. 16A and 16B illustrate the two-dolly cart 115 climbing stairs. The distance between the rigid casters 10 and the swivel casters 85 was chosen to match the tread and rise dimensions on this staircase.

While two and three dolly carts have been described, it will be apparent that even more dollies can be used to create an even larger and more robust cart. A user now has the flexibility to create a cart to optimally haul a load. For example, a user can fashion a three-dolly cart to move a large window, then add an additional dolly to move a 1000-lb. laminated header beam, and then remove two dollies to arrive at a smaller two dolly-cart 115 to haul a cabinet. In the prior art, the user would require several different carts to meet these demands, but now a single cart system can be quickly modified to optimally move various items—saving time, money and space.

FIGS. 17A-17C illustrate a one-dolly cart 125 carrying a load 120 (a cabinet). The slidable jaws of the dolly are not gripping with the load 120; rather, the load 120 is resting on the jaws.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently-preferred embodiment of the invention and are therefore representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A dolly (5) comprising:
   a caster/jaw support member (32) comprising:
      a first surface (25) opposite to a second surface (52);
      a sliding guide channel (30) within the first and second surfaces; and
      a slot (31) within the first and second surfaces;
   an upper jaw assembly (39) comprising:
      a first jaw (15) slidably mounted on the first surface (25); and
      a selectively engageable threading structure (65A, 65B, 65C) comprising a partially-threaded hole (65A-7, 65B-7, 65C-5), wherein the threading structure (65A, 65B, 65C) is disposed in a first hole (70,78) on the first jaw (15) and extending away from the first jaw (15) through the slot (31);
   a lower jaw assembly (38) comprising:
      a lower jaw carriage (50) slidably mounted on a second surface (52) and connected to the first jaw (15), wherein the selectively engageable threading structure (65A, 65B, 65C) is disposed in a second hole (75) on the lower jaw carriage (50);
      a threaded shaft (40) disposed in a receiver hole (62) on the lower jaw carriage (50) and disposed in the partially-threaded hole (65A-7, 65B-7, 65C-5); and
      an adjustment knob (45) connected to the threaded shaft (40); and
   a set of casters (10, 85) connected to and extending away from the caster/jaw support member (32).

2. The dolly (5) of claim 1, comprising:
   a disengaged configuration, where the selectively engageable threading structure (65A, 65B, 65C) is moved so as to disengage the threads of the partially-threaded hole (65A-7, 65B-7, 65C-5) from the threaded shaft (40), thereby allowing the first jaw (15) to slide along the first surface (25) without restriction from the threaded shaft (40); and
   an engaged configuration, where the selectively engageable threading structure (65A, 65B, 65C) is moved so as to engage the threads of the partially-threaded hole (65A-7, 65B-7, 65C-5) with the threaded shaft (40), such that rotating the adjustment knob (45) causes the first jaw (15) to slide along the first surface (25).

3. The dolly (5) of claim 2, wherein the movement for engagement and disengagement of the selectively engageable threading structure (65A, 65B) is translational.

4. The dolly (5) of claim 2, wherein the movement for engagement and disengagement of the selectively engageable threading structure (65C) is rotational.

5. The dolly (5) of claim 1, further comprising fasteners (37) connecting the lower jaw carriage (50) to the first jaw (15) through the sliding guide channel (30).

6. The dolly (5) of claim 1, wherein the selectively engageable threading structure (65A) comprises a spring (65A-1) and a partially-threaded slide block (65A-2), wherein threads of partially-threaded hole (65A-7) are limited to positions in the range of 3:00 to 9:00.

7. The dolly (5) of claim 1, wherein the selectively engageable threading structure (65B) comprises a spring (65B-1) and a partially-threaded slide block (65B-2), wherein threads of partially-threaded hole (65B-7) are limited to positions in the range of 9:00 to 3:00.

8. The dolly (5) of claim 1, wherein the selectively engageable threading structure (65C) comprises a partially-threaded rotating block (65C-1), wherein threads of partially-threaded hole (65C-5) are limited to positions in the range of 12:00 to 6:00 in a first region (65C-6) of the partially-threaded hole (65C-5) and limited to positions in the range of 6:00 to 12:00 in a second region (65C-7) of the partially-threaded hole (65C-5).

9. The dolly (5) of claim 1, further comprising a second upper jaw assembly with a second jaw (20) connected to a second lower jaw assembly.

10. The dolly (5) of claim 1, further comprising a low-friction slide member (35) in between the first surface (25) and the first jaw (15).

11. The dolly (5) of claim 1, wherein the threaded shaft (40) is disposed in a shaft support block (42), wherein the shaft support block (42) is attached to the caster/jaw support member (32).

12. The dolly (5) of claim 1, wherein the lower jaw carriage comprises carriage guide structures (55) disposed in the sliding guide channel (30).

13. The dolly (5) of claim 1, further comprising a crossmember support (63) connected to the caster/jaw support member (32).

14. The dolly (5) of claim 13, further comprising a crossmember (90, 91, 92) connected to the crossmember support (63).

15. The dolly (5) of claim 14, wherein the crossmember (92) has a bend.

16. The dolly (5) of claim 14, wherein the crossmember (91) is telescoping.

17. The dolly (5) of claim 16, wherein the telescoping crossmember (91) comprises a locking mechanism.

18. The dolly (5) of claim 14, wherein the crossmember (90, 91, 92) has a handle (95).

19. A cart (110, 115) comprising:
   at least two dollies (5) according to claim 13; and
   a crossmember (90, 92) connected to the crossmember support (63) of each dolly (5).

20. The cart (110, 115) of claim 19, wherein at least one of the dollies (5) comprises swivel casters (85).

21. The cart (110, 115) of claim 19, wherein:
   the dollies (5) define a load plane (111); and
   between the crossmember (90, 92) and the load plane (111), there is a space sufficient to allow for clearance for the forks of a lifting apparatus (112).

22. The cart (110, 115) of claim 19, wherein the crossmember (90, 90.1) has a handle (95).

23. The cart (110, 115) of claim 19, wherein each dolly (5) comprises:
- a disengaged configuration, where the selectively engageable threading structure (65A, 65B, 65C) is moved so as to disengage the threads of the partially-threaded hole (65A-7, 65B-7, 65C-5) from the threaded shaft (40), thereby allowing the first jaw (15) to slide along the first surface (25) without restriction from the threaded shaft (40); and
- an engaged configuration, where the selectively engageable threading structure (65A, 65B, 65C) is moved so as to engage the threads of the partially-threaded hole (65A-7, 65B-7, 65C-5) with the threaded shaft (40), such that rotating the adjustment knob (45) causes the first jaw (15) to slide along the first surface (25).

24. The cart (110, 115) of claim 23, wherein the movement for engagement and disengagement of the selectively engageable threading structure (65A, 65B) is translational.

25. The cart (110, 115) of claim 23, wherein the movement for engagement and disengagement of the selectively engageable threading structure (65C) is rotational.

26. The cart (110, 115) of claim 19, wherein the selectively engageable threading structure (65A) for each dolly (5) comprises a spring (65A-1) and a partially-threaded slide block (65A-2), and wherein threads of partially-threaded hole (65A-7) are limited to positions in the range of 3:00 to 9:00.

27. The cart (110, 115) of claim 19, wherein the selectively engageable threading structure (65A) for each dolly (5) comprises a spring (65B-1) and a partially-threaded slide block (65B-2), and wherein threads of partially-threaded hole (65B-7) are limited to positions in the range of 9:00 to 3:00.

28. The cart (110, 115) of claim 19, wherein the selectively engageable threading structure (65A) for each dolly (5) comprises a partially-threaded rotating block (65C-1), and wherein threads of partially-threaded hole (65C-5) are limited to positions in the range of 12:00 to 6:00 in a first region of the partially-threaded hole (65C-5) and are limited to positions in the range of 6:00 to 12:00 in a second region of the partially-threaded hole (65C-5).

\* \* \* \* \*